(12) United States Patent
Marchetti-Bowick et al.

(10) Patent No.: US 11,891,087 B2
(45) Date of Patent: Feb. 6, 2024

(54) SYSTEMS AND METHODS FOR GENERATING BEHAVIORAL PREDICTIONS IN REACTION TO AUTONOMOUS VEHICLE MOVEMENT

(71) Applicant: UATC, LLC, Pittsburgh, PA (US)

(72) Inventors: Micol Marchetti-Bowick, Pittsburgh, PA (US); Yiming Gu, Glenshaw, PA (US)

(73) Assignee: UATC, LLC, Pittsburgh, PA (US)

( * ) Notice: Subject to any disclaimer, the term of this patent is extended or adjusted under 35 U.S.C. 154(b) by 363 days.

(21) Appl. No.: 16/817,068

(22) Filed: Mar. 12, 2020

(65) Prior Publication Data

US 2021/0188316 A1 Jun. 24, 2021

Related U.S. Application Data

(60) Provisional application No. 62/951,628, filed on Dec. 20, 2019.

(51) Int. Cl.
| | | |
|---|---|---|
| *B60W 60/00* | (2020.01) | |
| *G06N 3/08* | (2023.01) | |
| *G06N 20/00* | (2019.01) | |

(52) U.S. Cl.
CPC .. *B60W 60/0011* (2020.02); *B60W 60/00274* (2020.02); *G06N 3/08* (2013.01); *G06N 20/00* (2019.01)

(58) Field of Classification Search
None
See application file for complete search history.

(56) References Cited

U.S. PATENT DOCUMENTS

| | | |
|---|---|---|
| 8,788,134 B1 | 7/2014 | Litkouhi et al. |
| 8,954,252 B1 | 2/2015 | Urmson et al. |
| 9,120,484 B1 | 9/2015 | Ferguson et al. |
| 9,443,153 B1 | 9/2016 | Gupta et al. |
| 9,558,659 B1 | 1/2017 | Silver et al. |
| 10,101,745 B1 | 10/2018 | Sun et al. |
| 11,568,207 B2 * | 1/2023 | van den Oord ......... G06F 18/22 |
| 2016/0068156 A1 | 3/2016 | Horii |

(Continued)

OTHER PUBLICATIONS

"Program Optimization" Sep. 29, 2018, Wikipedia (Year: 2018).*

*Primary Examiner* — James J Lee
*Assistant Examiner* — David Hatch
(74) *Attorney, Agent, or Firm* — Dority & Manning, P.A.

(57) ABSTRACT

Systems and methods are directed to generating behavioral predictions in reaction to autonomous vehicle movement. In one example, a computer-implemented method includes obtaining, by a computing system, local scene data associated with an environment external to an autonomous vehicle, the local scene data including actor data for an actor in the environment external to the autonomous vehicle. The method includes extracting, by the computing system and from the local scene data, one or more actor prediction parameters for the actor using a machine-learned parameter extraction model. The method includes determining, by the computing system, a candidate motion plan for the autonomous vehicle. The method includes generating, by the computing system and using a machine-learned prediction model, a reactive prediction for the actor based at least in part on the one or more actor prediction parameters and the candidate motion plan.

20 Claims, 10 Drawing Sheets

(56) References Cited

U.S. PATENT DOCUMENTS

| | | |
|---|---|---|
| 2016/0161270 A1 | 6/2016 | Okumura |
| 2016/0314224 A1 | 10/2016 | Wei et al. |
| 2017/0057514 A1 | 3/2017 | Toyoda et al. |
| 2017/0132334 A1 | 5/2017 | Levinson |
| 2017/0206464 A1* | 7/2017 | Clayton ................. G06N 3/044 |
| 2017/0297569 A1 | 10/2017 | Nilsson et al. |
| 2017/0329332 A1 | 11/2017 | Pilarski et al. |
| 2018/0004204 A1 | 1/2018 | Rider et al. |
| 2018/0086336 A1 | 3/2018 | Jones et al. |
| 2018/0089538 A1 | 3/2018 | Grabam et al. |
| 2018/0170388 A1 | 6/2018 | Shin |
| 2018/0196415 A1 | 7/2018 | Iagnemma et al. |
| 2018/0196416 A1 | 7/2018 | Iagnemma et al. |
| 2018/0374360 A1 | 12/2018 | Miao et al. |
| 2019/0072969 A1 | 3/2019 | Han et al. |
| 2019/0367020 A1* | 12/2019 | Yan ........................ G06V 20/58 |
| 2020/0249674 A1* | 8/2020 | Dally .............. B60W 60/00274 |
| 2021/0046924 A1* | 2/2021 | Caldwell ............... G05D 1/0088 |

\* cited by examiner

SYSTEMS AND METHODS FOR GENERATING BEHAVIORAL PREDICTIONS IN REACTION TO AUTONOMOUS VEHICLE MOVEMENT

PRIORITY CLAIM

The present application is based on and claims benefit of U.S. Provisional Application 62/951,628 having a filing date of Dec. 20, 2019, which is incorporated by reference herein.

FIELD

The present disclosure relates generally to predicting the behavior of an actor in an environment external to an autonomous vehicle. More particularly, the present disclosure relates to systems and methods to generate reactive behavioral predictions for an actor in reaction to a potential movement of an autonomous vehicle.

BACKGROUND

The implementation of efficient autonomous vehicle navigation requires the use of certain driving maneuvers. In some situations, these maneuvers necessitate that an autonomous vehicle predict the behavior of other actors in an environment external to the autonomous vehicle. As an example, a lane merging maneuver requires an autonomous vehicle to predict the behavior of other actors in response to the maneuver in order to determine a suitable path that avoids the other actors during the lane merging maneuver.

However, as these behavioral predictions can depend on both the autonomous vehicle's current/planned maneuvers and the behavior of actor(s), the predictions can be computationally complex. As such, in some situations the predictions cannot be performed efficiently in the time-frame required. Thus, autonomous vehicles can be forced to select less efficient driving maneuvers.

SUMMARY

Aspects and advantages of embodiments of the present disclosure will be set forth in part in the following description, or can be learned from the description, or can be learned through practice of the embodiments. One example aspect of the present disclosure is directed to a computer-implemented method for controlling an autonomous vehicle. The method includes obtaining, by a computing system comprising one or more computing devices, local scene data associated with an environment external to an autonomous vehicle, the local scene data comprising actor data for an actor in the environment external to the autonomous vehicle. The method further includes extracting, by the computing system and from the local scene data, one or more actor prediction parameters for the actor using a machine-learned parameter extraction model. The method further includes determining, by the computing system, a candidate motion plan for the autonomous vehicle, the candidate motion plan comprising a target motion trajectory for the autonomous vehicle. The method further includes generating, by the computing system and using a machine-learned prediction model, a reactive prediction for the actor based at least in part on the one or more actor prediction parameters and the candidate motion plan, the reactive prediction comprising a probability representing a likelihood of the actor reacting in a particular manner to a movement of the autonomous vehicle based on the candidate motion plan.

Another example aspect of the present disclosure is directed to an autonomous vehicle. The autonomous vehicle includes one or more processors and one or more non-transitory computer-readable media that collectively store machine-learned model(s). The machine-learned model(s) include a machine-learned parameter extraction model configured to obtain local scene data for an environment external to an autonomous vehicle, the local scene data comprising actor data for an actor in the environment external to the autonomous vehicle, and to extract one or more actor prediction parameters for the actor, the machine-learned parameter extraction model comprising a convolutional neural network. The machine-learned model(s) further include a machine-learned prediction model configured to receive one or more actor prediction parameters for the actor and a plurality of candidate motion plans, each candidate motion plan comprising a target motion trajectory for the autonomous vehicle, the machine-learned prediction model configured to process the actor prediction parameters and the plurality of candidate motion plans to generate, for each candidate motion plan of the plurality of candidate motion plans, a reactive prediction comprising a probability representing a likelihood of the actor reacting in a particular manner to a movement of the autonomous vehicle based on the candidate motion plan.

Another example aspect of the present disclosure is directed to a computing system. The computing system includes one or more processors and one or more non-transitory computer readable media that store instructions that, when executed by the one or more processors, cause the computing system to perform operations. The operations include obtaining local scene data for an environment external to an autonomous vehicle, the local scene data comprising actor data for the actor in the environment external to the autonomous vehicle. The operations further include extracting, from the local scene data, one or more actor prediction parameters for the actor using a machine-learned parameter extraction model. The operations further include determining a candidate motion plan for the autonomous vehicle, the candidate motion plan comprising a target motion trajectory for the autonomous vehicle. The operations further include generating, using a machine-learned prediction model, a reactive prediction for the actor based at least in part on the one or more actor prediction parameters and the candidate motion plan, the reactive prediction comprising a probability representing a likelihood of the actor reacting in a particular manner to a movement of the autonomous vehicle based on the candidate motion plan.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
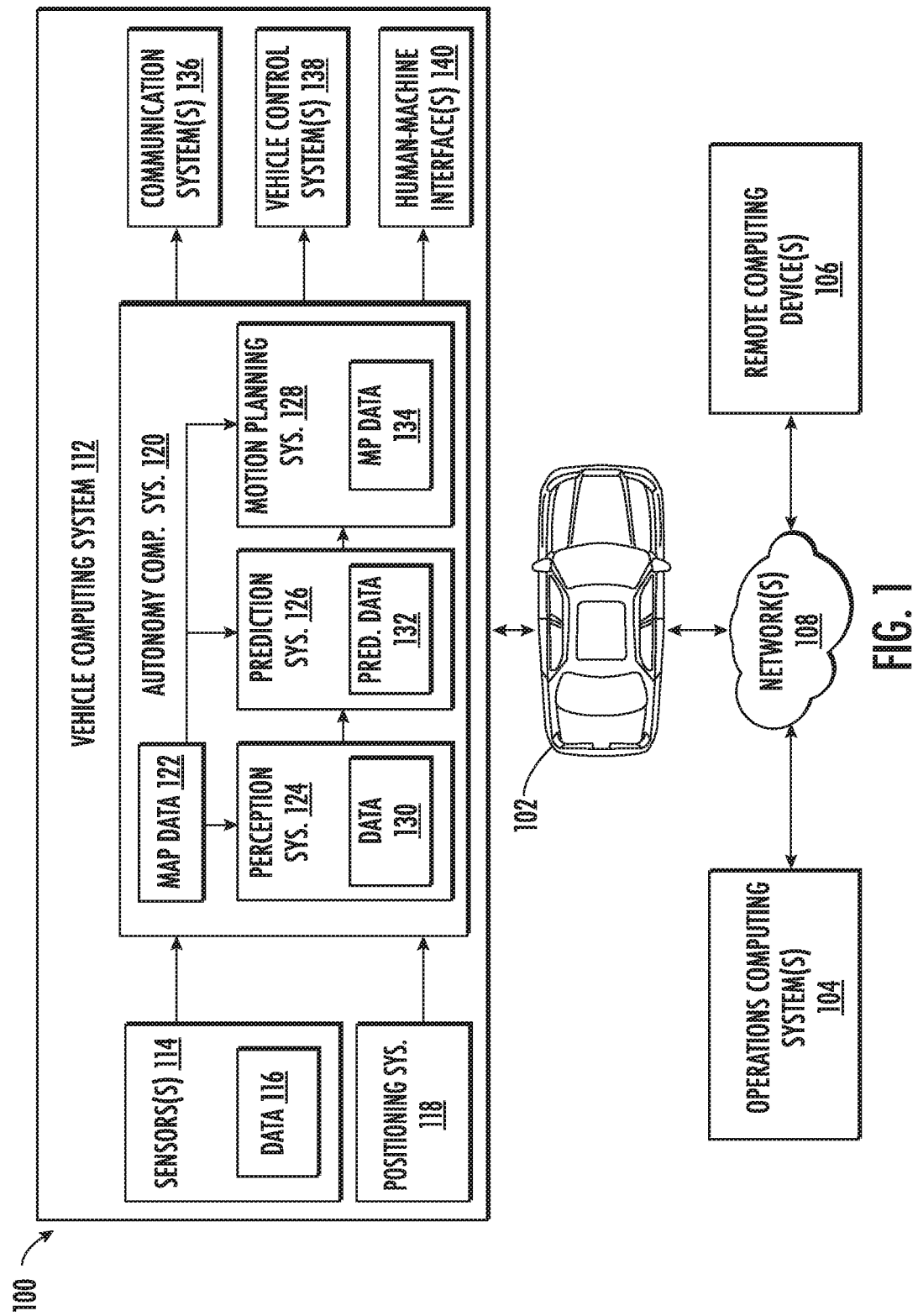
FIG. 1 depicts an example system overview including an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved systems and methods for predicting the behavioral reactions of actors in response to movement by an autonomous vehicle, prior to the autonomous vehicle executing such movements. More particularly, the example systems and methods described herein can enable an autonomous vehicle to evaluate the potential responses of actors to candidate motion plans of the autonomous vehicle so that these potential responses can be considered in selecting an optimal motion plan. For example, the autonomous vehicle can determine that a pedestrian is likely to cross at an approaching intersection in response to one possible speed of the autonomous vehicle, but is likely to wait without crossing in response to another possible speed of the autonomous vehicle. The autonomous vehicle can evaluate these differing responses as part of selecting an optimal motion plan for the vehicle. In example embodiments, the autonomous vehicle can obtain local scene data associated with an environment external to the vehicle. The local scene data can include actor data for actor(s) (e.g., vehicles, pedestrians, etc.) in an environment external to an autonomous vehicle. The local scene data can be provided as an input to a machine-learned parameter extraction model to extract actor prediction parameters from the scene data. These actor prediction parameters, alongside a candidate motion plan (e.g., a target motion trajectory for the autonomous vehicle), can be provided as inputs to a machine-learned prediction model. The machine-learned prediction model can generate a reactive prediction (e.g., a probability representing a likelihood of an actor reacting in a particular manner) for actor(s) in response to the autonomous vehicle's motion plan. The machine-learned prediction model can generate these predictions in response to a plurality of motion plans, enabling the autonomous vehicle to quickly and efficiently evaluate a large number of possible candidate motion plans when necessary. Thus, as an example, the present disclosure provides techniques to more accurately predict the reactions of actor(s) (e.g., vehicles, pedestrians, etc.) in the area of an autonomous vehicle in response to candidate motion plan(s) of the autonomous vehicle, therefore enabling the autonomous vehicle to protect pedestrians and other vehicles through safer navigation within an environment.

Predicting actor behavior in response to various possible movements by an autonomous vehicle can be computationally expensive. This computational expense can be exacerbated when additionally predicting actor behavior in response to the behavior of other actor(s) (e.g., a second actor's response to the first actor's response to autonomous vehicle movement). Traditionally, such predictions have not been feasible such that autonomous vehicles have operated without consideration of an actor's (e.g., vehicles) response to movements by the autonomous vehicle itself. As an example, an autonomous vehicle may wait for all actors in a certain vicinity to leave before attempting to merge lanes, without considering the effects of the autonomous vehicle's potential movements on the behavior of such actors. As another example, an autonomous vehicle may abandon a route requiring a lane merge movement in dense traffic situations. In accordance with example embodiments of the disclosed technology, a multi-model machine-learned system is provided that is capable of efficiently evaluating multiple candidate motion plans over a single a set of feature extractions, thereby enabling a computationally efficient technique. For example, a relatively lightweight prediction model can efficiently evaluate actor behavior in response to multiple candidate motions plans using feature data that is extracted once for an evaluation cycle.

In accordance with example embodiments of the present disclosure, an efficient division of processing operations is provided by utilizing a machine-learned multi-model architecture, allowing autonomous vehicles to accurately and efficiently predict the behavior of actor(s) in response to the movement of both the autonomous vehicle and other actors. Towards this goal, the present disclosure provides a method to extract actor prediction parameters using a more computationally expensive machine-learned parameter extraction model (e.g., a heavyweight model). The actor prediction parameters can be provided as input to a less computationally expensive machine-learned prediction model (e.g., a lightweight model) to quickly generate reactive predictions. The reactive prediction can include any suitable output, such as a yielding likelihood, a trajectory, timing profile(s), trajectory distribution(s), occupancy map(s), an acceleration likelihood, or any other representation of the predicted future behavior, etc. The outputs in some examples may be for each actor nearby the autonomous vehicle. As the machine-learned prediction model is generally designed to be less expensive than the machine-learned parameter extraction model, the reactive predictions can be generated relatively quickly for an actor(s) for a plurality of motion plans. Thus, a significant number of motion plans can be evaluated so that the autonomous vehicle can select the most optimal motion plan.

More particularly, local scene data for an environment external to an autonomous vehicle can be obtained. The local scene data can include actor data for an actor(s) (e.g., vehicles, pedestrians, obstacles, etc.) in the environment external to the autonomous vehicle. The actor data can include data that describes and/or depicts an actor(s) (e.g., the actor's current and/or historical state, the actor's proposed path, etc.). In some implementations, the actor data can include historical state data for each actor that describes previous states (e.g., motions, behaviors, etc.) of the actor(s). As an example, the historical state data can describe previous speeds and/or trajectories of the actor(s). As another example, the historical state data can describe behavior of the actor(s) (e.g., propensity for sudden braking motions, fast acceleration, lane drifting, etc.). In some implementations, the historical state data can include data evaluating the accuracy of previously generated behavioral predictions for the actor(s) in the environment external to the autonomous vehicle. Thus, the predictive performance of the machine-learned prediction model can be enhanced by evaluating the accuracy of previously generated reactive predictions.

In some implementations, the actor data can include current state data describing a current motion, trajectory, speed, or other metric associated with the actor(s) in the environment external to the autonomous vehicle. As an example, the current state data may indicate that the actor(s) is/are decelerating. As another example, the current state data may indicate that the actor(s) is/are merging into an adjacent lane. In some implementations, the actor data can include a proposed path for the actor(s) indicating a proposed motion trajectory for the actor(s). The proposed path of the actor(s) can be predicted by the autonomous vehicle, using either the machine-learned prediction model and/or a different machine-learned predictive model (e.g., a machine-learned yield prediction model, a machine-learned acceleration prediction model, etc.). In some implementations, the proposed path of the actor(s) can be transmitted by the actor(s) to the autonomous vehicle. As an example, two autonomous vehicles of the same autonomous rideshare service may communicate proposed paths to more efficiently facilitate autonomous travel.

In some implementations, the local scene data can further include contextual scene information. Contextual scene information can describe non-actor data describing an environment external to an autonomous vehicle. As an example, the contextual scene information can describe the transportation infrastructure traversed by the autonomous vehicle (e.g., number of lanes in a highway, a speed limit for a road, static obstacles, etc.). As another example, the contextual scene information can describe current and/or forecasted weather conditions for the environment external to the autonomous vehicle. In some implementations, the contextual scene information can include a map image (e.g., rasterized, vectorized, 3-dimensional representation, etc.) of the environment external to the autonomous vehicle.

In some implementations, the local scene data can include the autonomous vehicle's current state. The current state of the autonomous vehicle can include current velocity, autonomous vehicle system conditions, autonomous vehicle energy/fuel levels, or any other metrics associated with the autonomous vehicle. As an example, the current state of the autonomous vehicle can indicate that a LIDAR sensor on the rear of the vehicle is not functioning within normal parameters. As another example, the current state may indicate that the autonomous vehicle possesses movement capabilities that enable a certain type of motion trajectory (e.g., an engine that can produce an amount of acceleration required to perform a certain merge operation, etc.).

A machine-learned parameter extraction model can be used to extract one or more actor prediction parameters from the local scene data. Actor prediction parameters can be extracted for actor(s) in the environment external to the autonomous vehicle. In some implementations, the actor prediction parameters can be a relevant subset of information extracted from the local scene data. As an example, if a plurality of actors are present in the environment external to the autonomous vehicle, the actor prediction parameters can include actor data for a subset of the actors. As another example, the actor prediction parameters can include weather data and/or a rasterized image map from the local scene data. In some implementations, the actor prediction parameters can be a higher-level representation of at least a portion of the local scene data. As an example, the actor prediction parameters can be a latent space representation (e.g., using a convolutional neural network, autoencoder model, etc.) of at least a portion of the local scene data. The actor prediction parameters can be extracted in any form that enables their use as inputs to the machine-learned prediction model.

In accordance with example embodiments, the machine-learned parameter extraction model may include a neural network architecture that is configured to extract actor prediction parameters from the local scene data. Neural networks (e.g., deep neural networks) can be feed-forward neural networks, convolutional neural networks, and/or various other types of neural networks. As an example, the machine-learned parameter extraction model may include a convolutional neural network architecture configured to extract actor prediction parameters from the local scene data.

In some implementations, the machine-learned parameter extraction model can be trained independently from the machine-learned prediction model. As an example, the machine-learned parameter extraction model can be trained on a loss function that evaluates a difference between local scene training data and one or more corresponding actor prediction training parameters. The difference can be back-propagated through the machine-learned parameter extraction model to determine values associated with one or more parameters of the model to be updated. These parameters can be updated to minimize the difference evaluated by the loss function (e.g., using an optimization algorithm such as a gradient descent algorithm). In some implementations, the machine-learned parameter extraction model and the machine-learned prediction model can be trained jointly. As an example, the models can be trained using one or more loss functions (e.g., a respective loss function for each model, etc.). The loss function(s) can be backpropagated through the models to determine values associated with one or more parameters of the models to be updated. These parameters can be updated to minimize the difference evaluated by the loss function (e.g., using an optimization algorithm such as a gradient descent algorithm).

A candidate motion plan can be determined for the autonomous vehicle. The candidate motion plan can include a target motion trajectory for the vehicle and/or certain driving maneuvers (e.g., accelerating, decelerating, merging lanes, etc.). Candidate motion plans can be determined based at least in part on a cost function that evaluates the current locations and/or predicted future locations and/or moving paths of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

In some implementation, a plurality of candidate motion plans can be determined. If a plurality of candidate motion plans are determined, a candidate motion plan can be selected from the plurality of candidate motion plans based at least in part on a candidate rating to each candidate motion plan based at least in part on the costs associated with each candidate motion plan. Additionally, or alternatively, as will be discussed later in greater detail, the candidate motion plan can additionally be selected based at least in part on a reactive prediction for each actor in the environment external to the autonomous vehicle.

A reactive prediction can be generated for the actor(s) by the machine-learned prediction model. More particularly, the machine-learned prediction model can provide the actor prediction parameters and the candidate motion plan as inputs to generate reactive predictions for each actor as outputs. The machine-learned prediction model can be or can otherwise include various machine-learned models such as, for example, neural networks (e.g., deep neural networks or other types of models including linear models and/or non-linear models). Example neural networks include feed-forward neural networks, recurrent neural networks (e.g., long short-term memory recurrent neural networks), convolutional neural networks, or other forms of neural networks.

The reactive prediction can include a probability representing a likelihood of the actor reacting in a particular manner to a movement of the autonomous vehicle based on the candidate motion plan. More particularly, this probability can measure the likely behavior of an actor in response to a target motion trajectory of the candidate motion plan. As an example, the probability can measure the likelihood that an actor (e.g., a vehicle, pedestrian, etc.) positioned adjacent to the autonomous vehicle will react in a particular manner (e.g., yield, accelerate, decelerate, etc.) to the autonomous vehicle if the autonomous vehicle follows a suggested trajectory (e.g., performing a lane merging maneuver, etc.). It should be noted that the actor(s) reaction (e.g., reacting in particular manner) can be any type of reaction in response to the candidate motion plan (e.g., accelerating, decelerating, yielding, adjusting a current actor motion trajectory, maintaining a current actor motion trajectory, etc.). A reactive prediction model may provide various outputs which may vary according to example implementations. By way of example, the reactive prediction model may generate one or more outputs such as a trajectory, trajectory distribution, yielding likelihood, yielding timing profile, trajectory, acceleration likelihood, or any other representation of a predicted future behavior (e.g., an occupancy map). It is noted that the number and type of outputs described are exemplary only and that example implementations may utilize additional or fewer outputs, including those described or others as will be apparent.

The reactive prediction can be generated for the actor(s) in the environment external to the autonomous vehicle. By generating the reactive prediction for the actor(s), the motion planning system of the autonomous vehicle can more accurately predict the viability of a candidate motion plan. As an example, a reactive prediction for an actor based on a first candidate motion plan may indicate that the actor will not yield to a suggested trajectory of the candidate motion plan, leading to a potential collision. As another example, a reactive prediction for the same actor based on a second candidate motion plan may indicate that the actor will decelerate in reaction to the suggested trajectory of the candidate motion plan.

In some implementations, a plurality of candidate motion plans can be determined for the autonomous vehicle. A reactive prediction can be generated for the actor(s) based at least in part on each candidate motion plan. More particularly, each of the plurality of candidate motion plans can be evaluated based on the reactive prediction(s) generated in part from each candidate motion plan. In some implementations, a candidate rating can be assigned to each candidate motion plan based at least in part on the reactive prediction(s) associated with each candidate motion plan. As an example, reactive prediction(s) based on a first candidate motion plan may indicate that an actor adjacent to the autonomous vehicle would most likely not yield, increasing the chances of collision and therefore lowering an assigned candidate rating. Reactive predictions based on a second candidate motion plan may indicate that the same actor would most likely yield, decreasing the chances of a collision and therefore raising an assigned candidate rating. The second candidate motion plan can be selected by the autonomous vehicle based at least in part on the respective assigned candidate ratings of the first and second candidate motion plans. In such fashion, an optimal (e.g., safest, fastest, etc.) candidate motion plan can be selected by the autonomous vehicle. In some implementations, the autonomous vehicle can be operated based on the selected optimal candidate motion plan, as will be discussed in greater detail in the figures.

In some implementations, the reactive prediction can further include timing profiles for the actor(s). Timing profiles can describe one or more motions that can be performed by the actor at a corresponding series of times. In some implementations, the timing profile can be a yielding timing profile. As an example, a yielding timing profile for an actor can describe one or more yielding motions (e.g., decelerating, accelerating, merging lanes, etc.) the actor can take at a corresponding series of times (e.g., at 5 seconds, at 8.2357 seconds, etc.). In some implementations, the timing profile can be a non-yielding profile. As an example, a non-yielding timing profile for an actor can describe one or more non-yielding motions (e.g., decelerating, accelerating, merging lanes, maintaining position, etc.) that the actor can take at a corresponding series of times (e.g., at 0 seconds, at 3250 milliseconds, etc.). In some implementations, the timing profile can also describe one or more motions that can be performed by the actor at a corresponding series of positions. The reactive prediction can include both a yielding and a non-yielding timing profile (along with the likelihood of yielding, for example). As an example, the timing profile can describe one or more motions (e.g., accelerating, decelerating, merging lanes, etc.) that can be performed at a corresponding series of positions (e.g., decelerating in six feet, merging lanes in fifteen meters as another lane opens, etc.).

In some implementations, autonomous vehicle systems can include a prediction system and a motion planning system. The prediction system can be configured to obtain and/or generate local scene data (e.g., actor speeds, predicted actor trajectories, etc.). In some implementations, the prediction system can include the machine-learned parameter extraction model. The motion planning system can determine and select one or more candidate motion plans based at least in part on the local scene data and/or the extracted actor parameters. A candidate motion plan (e.g., a suggested trajectory for an autonomous vehicle, etc.) can include a step or a series of steps (e.g., accelerate, decelerate, merge lanes, etc.) for the autonomous vehicle to implement at a corresponding series of times (e.g., a schedule of driving maneuvers, etc.). In some implementations, the motion planning system can include the machine-learned prediction model. Thus, as the motion planning system determines one or more candidate motion plans, the candidate motion plans can be evaluated based at least in part on the predictions of the machine-learned prediction model.

In some implementations, the computational resource cost associated with utilizing the machine-learned parameter extraction model can be more computationally expensive than the computational resource cost associated with utilizing the machine-learned prediction model. As an example, utilizing the same computational resources (e.g., hardware accelerators, graphics processing units, etc.) for a certain amount of time, the machine-learned parameter extraction model may operate once while the machine-learned prediction model may operate a number of times. The relative speed of the machine-learned prediction model enables the model to evaluate multiple candidate motion plans based on a single set of actor prediction parameters. Thus, in such fashion, the more computationally expensive task (e.g., actor prediction parameter extraction) can be frontloaded so that the machine-learned prediction model can accurately and efficiently evaluate a plurality of candidate motion plans based on a single set of actor prediction parameters for the actor(s) in the environment external to the autonomous vehicle.

In some implementations, an interactive prediction can be generated for a first actor(s) by the machine-learned prediction model. The interactive prediction can include a probability representing a likelihood of the first actor reacting in a particular manner to movement of the autonomous vehicle based on the candidate motion plan and the reactive prediction for the second actor. As such, the interactive prediction can be generated based at least in part on a candidate motion plan, extracted actor prediction parameters for the first actor, and a reactive prediction for a second actor. More particularly, the machine-learned prediction model can receive one or more reactive predictions as inputs to generate the interactive prediction(s). As an example, the machine-learned prediction model can receive reactive predictions for a first, second, and third actor as inputs, alongside extracted actor prediction parameters for the second actor and a candidate motion plan, to generate an interactive prediction for the second actor.

The interactive prediction can include a probability representing a likelihood of the first actor reacting in a particular manner to movement of the autonomous vehicle based on the candidate motion plan and the reactive prediction for the second actor. More particularly, the probability for the first actor can account for the suggested behavior of the autonomous vehicle and the predicted behavior of the second actor. By way of example, a reactive prediction for a second actor can predict that the second actor will decelerate in response to a candidate motion plan for the autonomous vehicle. An interactive prediction for a first actor can predict that the first actor will merge lanes in response to both the candidate motion plan and the deceleration of the second actor.

However, the causal relationship between multiple actors can be difficult to approximate. Consider a specific example of a general interactive prediction problem for a joint distribution of the future state of an actor. Let I denote the set of all actors in the scene, where $i \in I$ indicates an individual actor. Let $X_t^{(i)}$ denote the current state of actor i at time t, and let $Y_H^{(i)}$ denote the future behavior of actor i over a given prediction horizon H. The joint distribution of the future behaviors of all actors in the scene can be represented as $P(\{Y_H^{(i)}\}_{i \in I} | \{X_t^{(i)}\}_{i \in I})$. The future state can be represented by future trajectories and the current state can be represented by the feature vector of all actors. As such, the goal can be represented as $Y_H^{(i) \in I}$ given the current state of $X_t^{(i) \in I}$, which can be unfolded in a number of ways based on different assumptions. However, as the joint distribution of all trajectories (e.g., $Y_H^{(i) \in I}$) can be prohibitively difficult to express, an alternative solution can include sampling the marginal distribution (e.g. $Y_H^{(i)}|X_t^{(i) \in I}$ and $Y_H^{(i)}|Y_H^{(-i)}$, $X_t^{(i) \in I}$). The complete formulation can then be given as set forth in equation 1, wherein P represents a level of thinking (e.g., level-k thinking, etc.):

$$Y_H^{(i) \in I}|X_t^{(i) \in I} = \Pi_{j \in I} Y_H^{(j)} |X_t^{(i) \in I}\Pi_p \Pi_{k \in I} Y_H^{(k)}|Y_H^{(-k)}, X_t^{(i) \in I}$$

Equation 1

Level-k thinking can be used to represent that the actors act rationally and that the actors assume other actors will act rationally. Thus, the interactive prediction for an actor provides a causal behavioral prediction for an actor in response to both an autonomous vehicle's movement and the predicted behavior of other actor(s) in response to the vehicle's movement. In this fashion, as the actor(s) react to both the movement of the autonomous vehicle and the movement of other actors in response to the autonomous vehicle's movement, the autonomous vehicle can more accurately predict the causal effects of a candidate motion plan amongst multiple actors.

In accordance with example embodiments, the machine-learned prediction model may include a neural network architecture that is configured to generate reactive prediction(s) for actor(s) in reaction to a candidate motion plan. Neural networks (e.g., deep neural networks) can be feed-forward neural networks, convolutional neural networks, and/or various other types of neural networks. As an example, the machine-learned prediction model may include a convolutional neural network architecture configured to generate reactive prediction(s) for actor(s) in reaction to a candidate motion plan. In some implementations, the machine-learned prediction model can be trained independently from the machine-learned parameter extraction model. As an example, the machine-learned prediction model can be trained on a loss function that evaluates a difference between a reactive prediction for a training actor and an actual reaction for the training actor. The difference can be backpropagated through the machine-learned prediction model to determine values associated with one or more parameters of the model to be updated. These parameters can be updated to minimize the difference evaluated by the loss function (e.g., using an optimization algorithm such as a gradient descent algorithm). Similarly, as discussed previously, the machine-learned prediction model and the machine-learned parameter extraction model can be trained jointly (e.g., using one or more loss functions).

Various means can be configured to perform the methods and processes described herein. For example, a computing system can include data obtaining unit(s), parameter extraction unit(s), motion plan determination unit(s), reactive prediction generation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain data (e.g., local scene data) from an autonomous vehicle that includes actor data for actor(s) in an environment external to the autonomous vehicle. A data obtaining unit is an example of means obtaining such data from an autonomous vehicle at a vehicle computing system as described herein.

The means can be configured to extract one or more actor prediction parameters from the local scene data for the actor(s) in the environment external to the autonomous vehicle. For example, the means can be configured to use a machine-learned parameter extraction model to extract one or more actor prediction parameters for the actor(s) in the environment external to the autonomous vehicle. A parameter extraction unit is one example of a means for extracting actor prediction parameters as described herein.

The means can be configured to determine candidate motion plans for the autonomous vehicle. For example, the means can be configured to determine a plurality of candidate motion plans that each include a target motion trajectory for the autonomous vehicle. A motion plan determination unit is one example of a means for determining candidate motion plan(s) as described herein The means can be configured to generate reactive predictions for the actor(s) in the environment external to the autonomous vehicle. For example, the means can be configured to use a machine-learned prediction model to generate reactive predictions that include a probability representing a likelihood of the actor(s) reacting in a particular manner to a movement of the autonomous vehicle based on the candidate motion plan. A prediction generation unit is one example of a means for generating reactive predictions.

Embodiments in accordance with the disclosed technology provide a number of technical effects and benefits, particularly in the areas of computing technology, autonomous vehicles, and the integration of computing technology with autonomous vehicles. In particular, example implementations of the disclosed technology provided improved techniques for predicting the behavior of actor(s) in an environment external to the autonomous vehicle. For example, by utilizing one or more implementations of the disclosed technology, a vehicle computing system can more accurately and efficiently predict the behavior of actors (e.g., vehicles, bicycles, pedestrians, etc.) that share the road with the autonomous vehicle. Further, one or more implementations of the disclosed technology can predict the response of actors in response to other actors. By more accurately and efficiently predicting actor behavior, embodiments in accordance with the present disclosure can enable safer autonomous driving with respect to the autonomous vehicle and external actors.

In accordance with example embodiments, improved actor prediction systems for autonomy computing systems can be provided by using a distributed machine-learned model system to extract actor parameters from local scene data to and generate predictions (e.g., reactive and/or interactive predictions, yield probabilities, acceleration probabilities, timing profiles, etc.) of the actor(s) behavior in response to the suggested trajectory of the autonomous vehicle. A machine-learned parameter extraction model in accordance with the present disclosure may efficiently front-load computationally expensive tasks so that the machine-learned prediction model can quickly and efficiently generate reactive/interactive predictions for actor(s).

Accordingly, an autonomous vehicle according to example embodiments of the present disclosure can include a sensor system configured to generate sensor data of an environment external to the autonomous vehicle, one or more processors, and one or more non-transitory computer-readable media that collectively store machine-learned model(s) configured to extract actor prediction parameters and generate reactive/interactive predictions for the actor(s) in the environment external to an autonomous vehicle. The media can include instructions that, when executed by the one or more processors, cause the computing system to perform operations. The operations can include inputting, to the machine-learned model parameter extraction model, local scene data associated with an environment external to an autonomous vehicle including actor data for the actor(s) in the environment external to the autonomous vehicle. The operations can include extracting, by the machine-learned parameter extraction model and from the local scene data, one or more actor prediction parameters for the actor(s) in the environment external to the autonomous vehicle. The operations can include inputting, to the machine-learned prediction model, the actor prediction parameter(s) and a candidate motion plan. The operations can include receiving, by the machine-learned prediction model and based at least in part on the candidate motion plan and the actor prediction parameter(s), reactive prediction(s) for the actor(s) that include a probability representing a likelihood of the actor(s) reacting in a particular manner to movement of the autonomous vehicle based on the candidate motion plan.

According to some example embodiments, an autonomous vehicle can include a computing system that is configured to obtain local scene data for an environment external to an autonomous vehicle including actor data for the actor(s) in the environment. The autonomous vehicle can extract one or more actor prediction parameters for the actor(s). The autonomous vehicle can determine a candidate motion plan comprising a target motion trajectory for the autonomous vehicle. The autonomous vehicle can generate a reactive prediction for the actor(s) based at least in part on the actor prediction parameters in reaction to a movement of the autonomous vehicle based on the candidate motion plan.

With reference to the figures, example embodiments of the present disclosure will be discussed in further detail.

FIG. 1 depicts a block diagram of an example system 100 for controlling the computational functions of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; local scene data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 to determine if the computational resources (e.g., vehicle computing system 112) is unused or under-utilized. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the current or forecasted navigational route of the vehicle, and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing device 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. As one example, the vehicle computing system 112 can include specialized hardware devices for autonomous driving data processing (e.g., graphics processing units, hardware accelerators, etc.). These specialized hardware devices can possess processing capacity sufficient to process data in the worst-case data processing situations the autonomous vehicle can encounter (e.g., left turns in an urban environment, rain/snow conditions, etc.). As another example, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, local scene data 130 that describes a current state of such object. As examples, the local scene data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine local scene data 130 for each object over a number of iterations. In particular, the perception system 124 can update the local scene data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects). Additionally, or alternatively, the local scene data 130 can include the map data 122.

The prediction system 126 can receive the local scene data 130 from the perception system 124 and predict one or more future locations and/or moving paths for each object based on such local scene data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the environment external to the vehicle 102. For example, the predicted path (e.g., trajectory) can indicate a path along which the respective object (e.g., an actor) is predicted to travel over time (and/or the velocity at which the object is predicted to travel along the predicted path). The prediction system 126 can provide the prediction data 132 associated with the one or more objects to the motion planning system 128. In some implementations, the prediction system 126 can be configured to obtain and/or generate actor data (e.g., actor speeds, predicted actor trajectories, etc.) for an actor (e.g., an object) in an environment external to the vehicle. Actor data can be included in prediction data 132. In some implementations, the prediction system 126 can include a machine-learned parameter extraction model. The machine-learned parameter extraction model can extract actor prediction parameters from the local scene data 130. The extracted actor prediction parameters can be included in prediction data 132. The operation of the local scene data and the machine-learned parameter extraction model will be discussed in further detail in FIG. 2.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102. In some implementations, the motion planning system 128 can obtain and select one or more candidate motion plans based at least in part on the local scene data and/or the extracted actor prediction parameters. The local scene data and/or extracted actor prediction parameters can be included in the prediction data 132. In some implementations, the motion planning system 128 can include a machine-learned prediction model. The machine-learned prediction model can receive extracted actor prediction parameters and a candidate motion plan as inputs and output a reactive prediction for an actor in the environment external to the autonomous vehicle. Thus, as the motion planning system 128 obtains one or more candidate motion plans, the candidate motion plans can be evaluated based at least in part on the predictions of the machine-learned prediction model.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
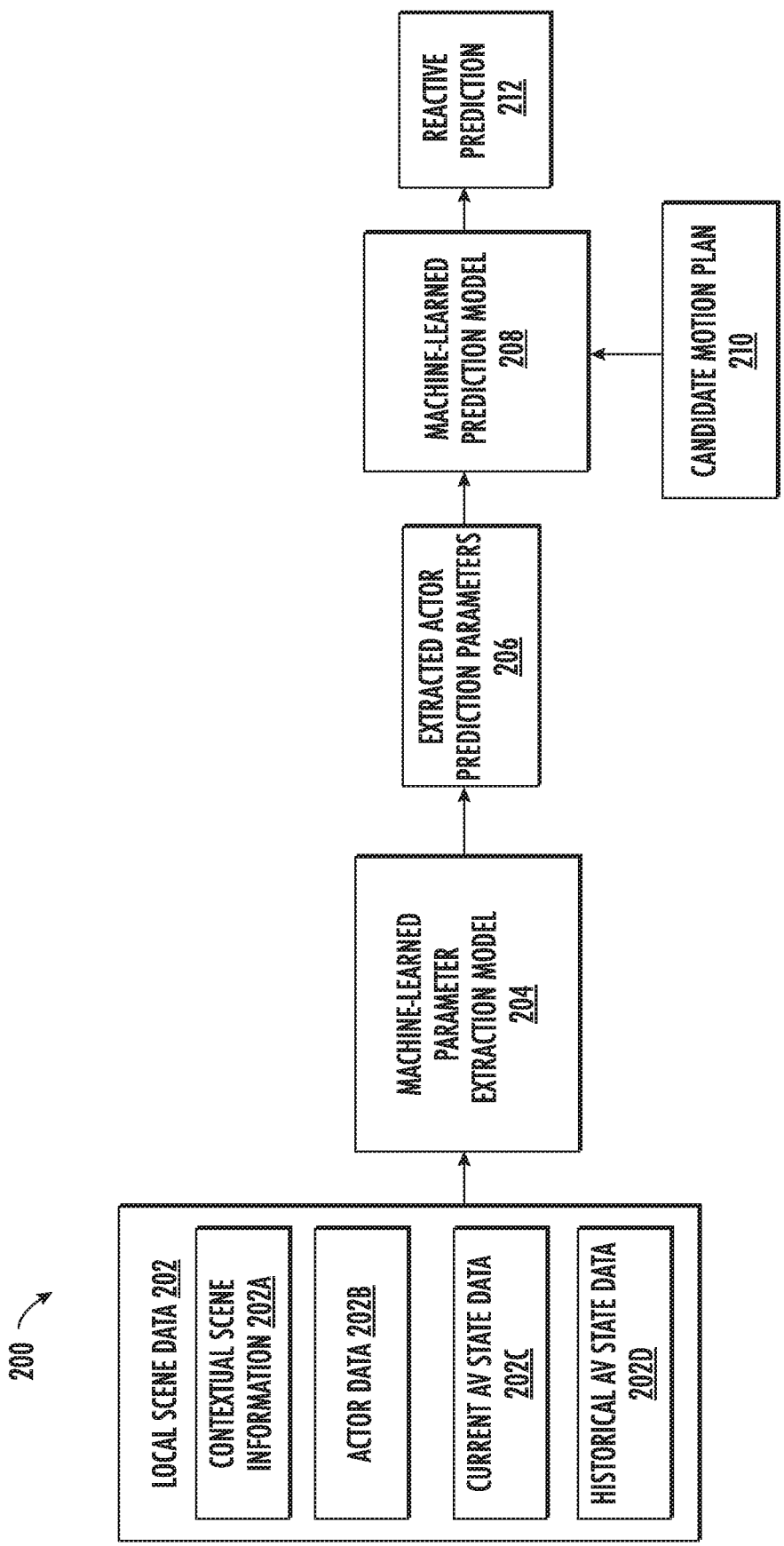
FIG. 2 is a block diagram depicting a process for generating a reactive prediction using a machine-learned prediction model according to example embodiments of the present disclosure.

FIG. 2 is a block diagram depicting a process for generating a reactive prediction using a machine-learned prediction model according to example embodiments of the present disclosure. Local scene data 202 can be input into the machine-learned parameter extraction model 204. The local scene data 202 can include contextual scene information 202A. Contextual scene information 202A can describe non-actor data describing an environment external to an autonomous vehicle. As an example, the contextual scene information can describe the transportation infrastructure traversed by the autonomous vehicle (e.g., number of lanes in a highway, a speed limit for a road, static obstacles, etc.). As another example, the contextual scene information can describe current and/or forecasted weather conditions for the environment external to the autonomous vehicle. In some implementations, the contextual scene information can include a map image (e.g., rasterized, vectorized, 3-dimensional representation, etc.) of the environment external to the autonomous vehicle.

The local scene data 202 can include actor data 202B for an actor (e.g., vehicles, pedestrians, obstacles, etc.) in the environment external to the autonomous vehicle. The actor data 202B can include data that describes and/or depicts an actor (e.g., the actor's current and/or historical state, the actors proposed path, etc.). In some implementations, the actor data 202B can include historical state data for an actor that describes previous states (e.g., motions, behaviors, etc.) of each actor. As an example, the historical state data can describe previous speeds and/or trajectories of an actor. As another example, the historical state data can describe behavior of an actor (e.g., propensity for sudden braking motions, fast acceleration, lane drifting, etc.). In some implementations, the historical state data can include data evaluating the accuracy of previously generated behavior predictions for an actor in the environment external to the autonomous vehicle. Thus, the predictive performance of the machine-learned prediction model 208 can be enhanced by evaluating the accuracy of previously generated predictions.

The local scene data 202 can include current autonomous vehicle state data 202C. The current autonomous vehicle state data 202C can include current velocity, autonomous vehicle system conditions, autonomous vehicle energy/fuel levels, or any other metrics associated with the autonomous vehicle. As an example, the current autonomous vehicle state data 202C can indicate that a LIDAR sensor on the rear of the vehicle is not functioning within normal parameters. As another example, the current autonomous vehicle state data 202C may indicate that the autonomous vehicle possesses movement capabilities that enable a certain type of motion trajectory (e.g., an engine that can produce an amount of acceleration required to perform a certain merge operation, etc.).

The local scene data 202 can be input into a machine-learned parameter extraction model 204. The machine-learned parameter extraction model 204 may include a neural network architecture that is configured to extract actor prediction parameters 206 from the local scene data 202. Neural networks (e.g., deep neural networks) can be feed-forward neural networks, convolutional neural networks, and/or various other types of neural networks. As an example, the machine-learned parameter extraction model 204 may include a convolutional neural network architecture configured to extract actor prediction parameters 206 from the local scene data 202.

The machine-learned parameter extraction model 204 can be used to extract one or more actor prediction parameters 206 from the local scene data 202. Extracted actor prediction parameters 206 can be extracted for an actor in the environment external to the autonomous vehicle. In some implementations, the extracted actor prediction parameters 206 can be a relevant subset of information extracted from the local scene data 202. As an example, if a plurality of actors are present in the environment external to the autonomous vehicle, the extracted actor prediction parameters 206 can include actor data 202B for a subset of the actors in the environment external to the vehicle. As another example, the extracted actor prediction parameters 206 can include weather data and/or a rasterized image map from the contextual scene information 202A. In some implementations, the extracted actor prediction parameters 206 can be a lower-level representation of at least a portion of the local scene data 202. As an example, the extracted actor prediction parameters 206 can be a latent space representation (e.g., using a convolutional neural network, autoencoder model, etc.) of at least a portion of the local scene data 202. The extracted actor prediction parameters 206 can be extracted in any form that enables their use as inputs to the machine-learned prediction model 208.

The extracted actor prediction parameters 206 can be input into a machine-learned prediction model 208. The machine-learned prediction model 208 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

A candidate motion plan 210 can be obtained and input into the machine-learned prediction model 208. The candidate motion plan 210 can include a target motion trajectory for the vehicle and/or certain driving maneuvers (e.g., accelerating, decelerating, merging lanes, etc.). Candidate motion plan(s) 210 can be determined based at least in part on a cost function that evaluates the current locations and/or predicted future locations and/or moving paths of the objects. For example, the cost function can describe a cost (e.g., over time) of adhering to a particular candidate motion plan 210. For example, the cost described by a cost function can increase when the autonomous vehicle approaches impact with another object and/or deviates from a preferred pathway (e.g., a predetermined travel route).

The machine-learned prediction model 208 can receive the extracted actor prediction parameters 206 and candidate motion plan 210 as inputs and generate reactive prediction(s) 212 as outputs. The reactive prediction can include a probability representing a likelihood of the actor reacting in a particular manner to a movement of the autonomous vehicle based on the candidate motion plan 210. More particularly, this probability can measure the likely behavior of an actor in response to a target motion trajectory of the candidate motion plan 210. As an example, the probability can measure the likelihood that an actor (e.g., a vehicle, pedestrian, etc.) positioned adjacent to the autonomous vehicle will react in a particular manner (e.g., yield, accelerate, decelerate, etc.) to the autonomous vehicle if the autonomous vehicle follows a suggested trajectory (e.g., performing a lane merging maneuver, etc.). It should be noted that the actor(s) reaction (e.g., reacting in particular manner) can be any type of reaction in response to the candidate motion plan (e.g., accelerating, decelerating, yielding, adjusting a current actor motion trajectory, maintaining a current actor motion trajectory, etc.).

By generating the reactive prediction 212 for an actor, the motion planning system of the autonomous vehicle can more accurately predict the viability of a candidate motion plan 210. As an example, a reactive prediction 212 for an actor based on a first candidate motion plan 210 may indicate that the actor will not yield to a suggested trajectory of the candidate motion plan 210, leading to a potential collision. As another example, a reactive prediction 212 for the same actor based on a second candidate motion plan 210 may indicate that the actor will yield to the suggested trajectory of the candidate motion plan 210.

In some implementations, the reactive prediction 212 can further include timing profiles for the actor(s). Timing profiles can describe one or more motions that can be performed by the actor at a corresponding series of times. In some implementations, the timing profile can be a yielding timing profile. As an example, a yielding timing profile for an actor can describe one or more yielding motions (e.g., decelerating, accelerating, merging lanes, etc.) the actor can take at a corresponding series of times (e.g., at 5 seconds, at 8.2357 seconds, etc.). In some implementations, the timing profile can be a non-yielding profile. As an example, a non-yielding timing profile for an actor can describe one or more non-yielding motions (e.g., decelerating, accelerating, merging lanes, maintaining position, etc.) that the actor can take at a corresponding series of times (e.g., at 0 seconds, at 3250 milliseconds, etc.). In some implementations, the timing profile can also describe one or more motions that can be performed by the actor at a corresponding series of positions. As an example, the timing profile can describe one or more motions (e.g., accelerating, decelerating, merging lanes, etc.) that can be performed at a corresponding series of positions (e.g., decelerating in six feet, merging lanes in fifteen meters as another lane opens, etc.).

Figure 3:
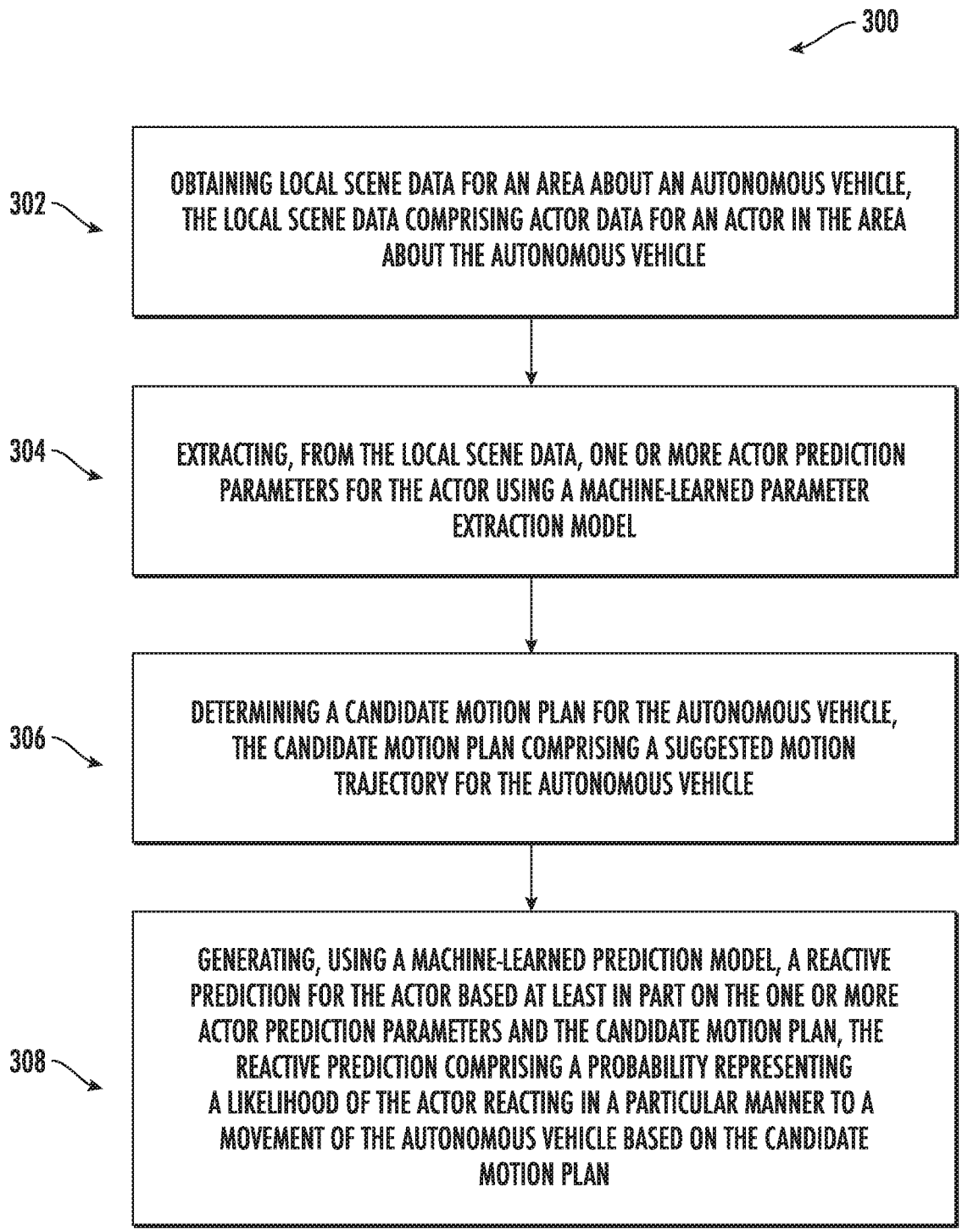
FIG. 3 depicts a flowchart illustrating an example method for generating a reactive prediction for an actor based at least in part on actor prediction parameters and the candidate motion plan according to example embodiments of the present disclosure.

FIG. 3 depicts a flowchart illustrating an example method for generating a reactive prediction for an actor based at least in part on actor prediction parameters and the candidate motion plan according to example embodiments of the present disclosure. One or more portion(s) of the operations of method 300 can be implemented by one or more computing systems that include, for example, a vehicle computing system (e.g., vehicle computing system 112, etc.) Each respective portion of the method 300 can be performed by any (or any combination) of the computing device(s) of the respective computing system. Moreover, one or more portion(s) of the method 300 can be implemented as an algorithm on the hardware components of the device(s) described herein, for example, to generate reactive predictions. FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 302, method 300 can include obtaining local scene data associated with an environment external to an autonomous vehicle. The local scene data can include actor data for an actor(s) (e.g., vehicles, pedestrians, obstacles, etc.) in the environment external to the autonomous vehicle. The actor data can include data that describes and/or depicts an actor(s) (e.g., the actor's current and/or historical state, the actor's proposed path, etc.). In some implementations, the actor data can include historical state data for each actor that describes previous states (e.g., motions, behaviors, etc.) of the actor(s). As an example, the historical state data can describe previous speeds and/or trajectories of the actor(s). As another example, the historical state data can describe behavior of the actor(s) (e.g., propensity for sudden braking motions, fast acceleration, lane drifting, etc.).

In some implementations, the actor data can include current state data describing a current motion, trajectory, speed, or other metric associated with each actor in the environment external to the autonomous vehicle. As an example, the current state data may indicate that an actor is decelerating. As another example, the current state data may indicate that an actor is merging into an adjacent lane. In some implementations, the actor data can include a proposed path for an actor indicating a proposed motion trajectory for an actor. The proposed path of an actor can be predicted by the autonomous vehicle, using either the machine-learned prediction model and/or a different machine-learned predictive model. In some implementations, the proposed path of an actor can be transmitted by the actor to the autonomous vehicle. As an example, two autonomous vehicles of the same autonomous rideshare service may communicate proposed paths to more efficiently facilitate autonomous travel.

In some implementations, the actor data can include current state data describing a current motion, trajectory, speed, or other metric associated with the actor(s) in the environment external to the autonomous vehicle. As an example, the current state data may indicate that the actor(s) is/are decelerating. As another example, the current state data may indicate that the actor(s) is/are merging into an adjacent lane. In some implementations, the actor data can include a proposed path for the actor(s) indicating a proposed motion trajectory for the actor(s). The proposed path of the actor(s) can be predicted by the autonomous vehicle, using either the machine-learned prediction model and/or a different machine-learned predictive model (e.g., a machine-learned yield prediction model, a machine-learned acceleration prediction model, etc.). In some implementations, the proposed path of the actor(s) can be transmitted by the actor(s) to the autonomous vehicle. As an example, two autonomous vehicles of the same autonomous rideshare service may communicate proposed paths to more efficiently facilitate autonomous travel.

In some implementations, the local scene data can further include contextual scene information. Contextual scene information can describe non-actor data describing an environment external to an autonomous vehicle. As an example, the contextual scene information can describe the transportation infrastructure traversed by the autonomous vehicle (e.g., number of lanes in a highway, a speed limit for a road, static obstacles, etc.). As another example, the contextual scene information can describe current and/or forecasted weather conditions for the environment external to the autonomous vehicle. In some implementations, the contextual scene information can include a map image (e.g., rasterized, vectorized, 3-dimensional representation, etc.) of the environment external to the autonomous vehicle.

At 304, method 300 can include extracting one or more actor prediction parameters for the actor using a machine-learned parameter extraction model. Actor prediction parameters can be extracted for an actor in the environment external to the autonomous vehicle. In some implementations, the actor prediction parameters can be a relevant subset of information extracted from the local scene data. As an example, the actor prediction parameters can include weather data and/or a rasterized image map from the local scene data. In some implementations, the actor prediction parameters can be a lower-level representation of at least a portion of the local scene data. As an example, the actor prediction parameters can be a latent space representation (e.g., using a convolutional neural network, autoencoder model, etc.) of at least a portion of the local scene data. The actor prediction parameters can be extracted in any form that enables their use as inputs to the machine-learned prediction model.

At 306, method 300 can include obtaining a candidate motion plan for the autonomous vehicle. The candidate motion plan can include a target motion trajectory for the vehicle and/or certain driving maneuvers (e.g., accelerating, decelerating, merging lanes, etc.). Candidate motion plans can be determined based at least in part on a cost function that evaluates the current locations and/or predicted future locations and/or moving paths of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

At 308, method 300 can include generating a reactive prediction for the actor based at least in part on the one or more actor prediction parameters and the candidate motion plan. The reactive prediction can include a probability representing a likelihood of the actor reacting in a particular manner to a movement of the autonomous vehicle based on the candidate motion plan. More particularly, this probability can measure the likely behavior of an actor in response to a target motion trajectory of the candidate motion plan. As an example, the probability can measure the likelihood that an actor (e.g., a vehicle, pedestrian, etc.) positioned adjacent to the autonomous vehicle will react in a particular manner (e.g., yield, accelerate, decelerate, etc.) to the autonomous vehicle if the autonomous vehicle follows a suggested trajectory (e.g., performing a lane merging maneuver, etc.).

Figure 4:
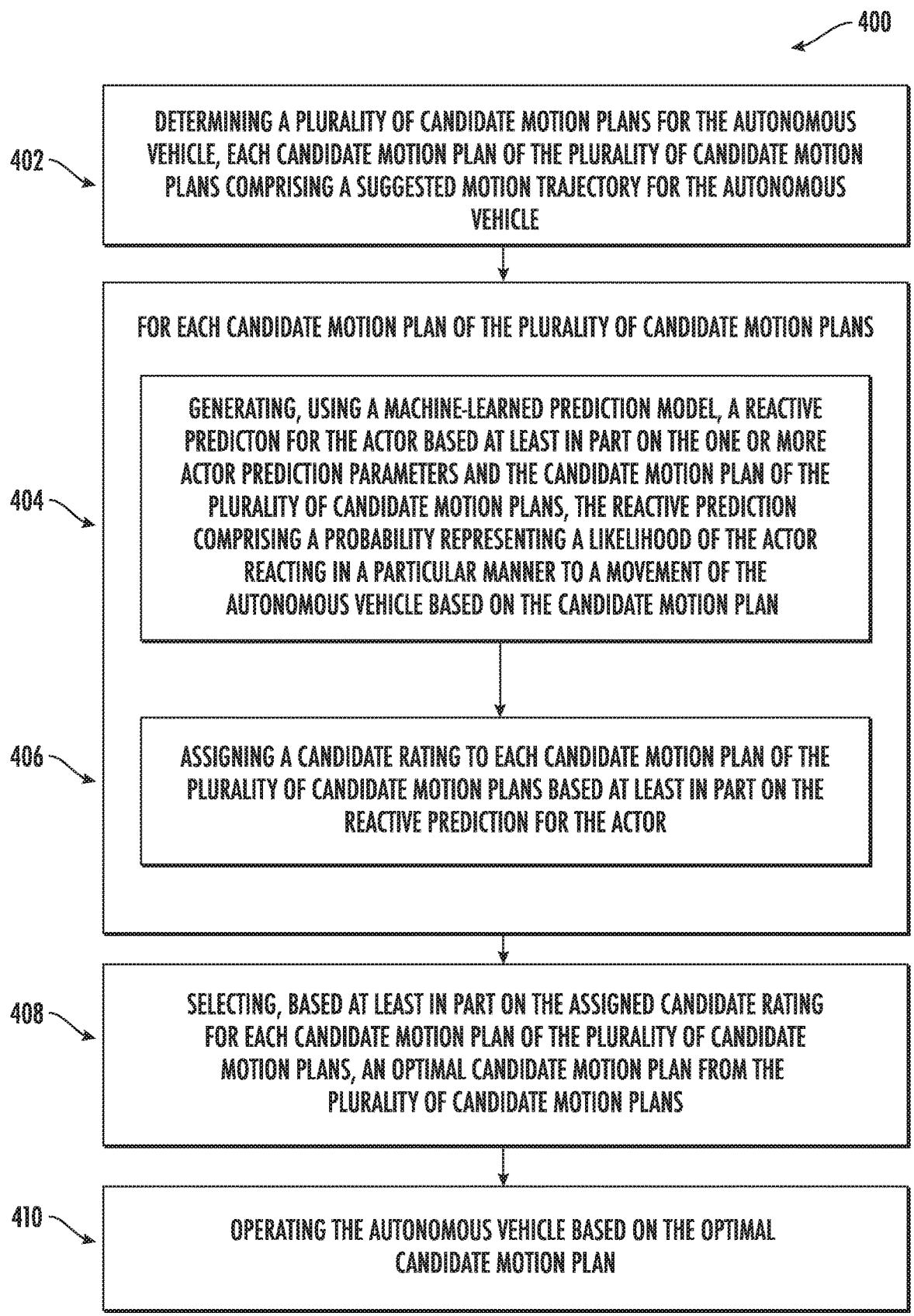
FIG. 4 depicts a flowchart illustrating an example method for operating an autonomous vehicle based on a selected optimal candidate motion plan of a plurality of candidate motion plans according to example embodiments of the present disclosure.

FIG. 4 depicts a flowchart illustrating an example method for operating an autonomous vehicle based on a selected optimal candidate motion plan of a plurality of candidate motion plans according to example embodiments of the present disclosure. One or more portion(s) of the operations of method 400 can be implemented by one or more computing systems that include, for example, a vehicle computing system (e.g., vehicle computing system 112, etc.) Each respective portion of the method 400 can be performed by any (or any combination) of the computing device(s) of the respective computing system. Moreover, one or more portion(s) of the method 400 can be implemented as an algorithm on the hardware components of the device(s) described herein, for example, to generate reactive predictions. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 402, method 400 can include obtaining a plurality of candidate motion plans for the autonomous vehicle. Each candidate motion plan of the plurality of candidate motion plans can include a suggested motion trajectory for the autonomous vehicle. The candidate motion plans can include a target motion trajectory for the vehicle and/or certain driving maneuvers (e.g., accelerating, decelerating, merging lanes, etc.). Candidate motion plans can be determined based at least in part on a cost function that evaluates the current locations and/or predicted future locations and/or moving paths of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

At 404, method 400 can include, for each candidate motion plan of the plurality of candidate motion plans, generating, using a machine-learned prediction model, a reactive prediction for the one or more actors. The reactive prediction can be based at least in part on the one or more actor prediction parameters and the candidate motion plan of the plurality of candidate motion plans. The reactive prediction can include a probability representing a likelihood of the actor reacting in a particular manner to a movement of the autonomous vehicle based on the candidate motion plan. The reactive prediction(s), as mentioned previously, can be generated for each candidate motion plan of the plurality of motion plans.

At 406, method 400 can include, for each candidate motion plan of the plurality of candidate motion plans, assigning a candidate rating to each candidate motion plan of the plurality of candidate motion plans. The candidate rating can be based at least in part on the reactive prediction for the actor(s). As an example, reactive prediction(s) based on a first candidate motion plan may indicate that an actor adjacent to the autonomous vehicle would most likely not yield, increasing the chances of collision and therefore lowering an assigned candidate rating. Reactive prediction(s) based on a second candidate motion plan may indicate that the same actor would most likely yield, decreasing the chances of a collision and therefore raising an assigned candidate rating.

At 408, method 400 can include selecting an optimal candidate motion plan from the plurality of candidate motion plans. The optimal candidate motion plan can be selected based at least in part on the assigned candidate rating for each candidate motion plan. As an example, a first candidate motion plan with a higher candidate rating can be selected over a second candidate motion plan with a lower candidate rating. In such fashion, an optimal (e.g., safest, fastest, etc.) candidate motion plan can be selected by the autonomous vehicle.

At 410, method 400 can include operating the autonomous vehicle based on the optimal candidate motion plan, as discussed in greater detail with reference to FIG. 1.

Figure 5:
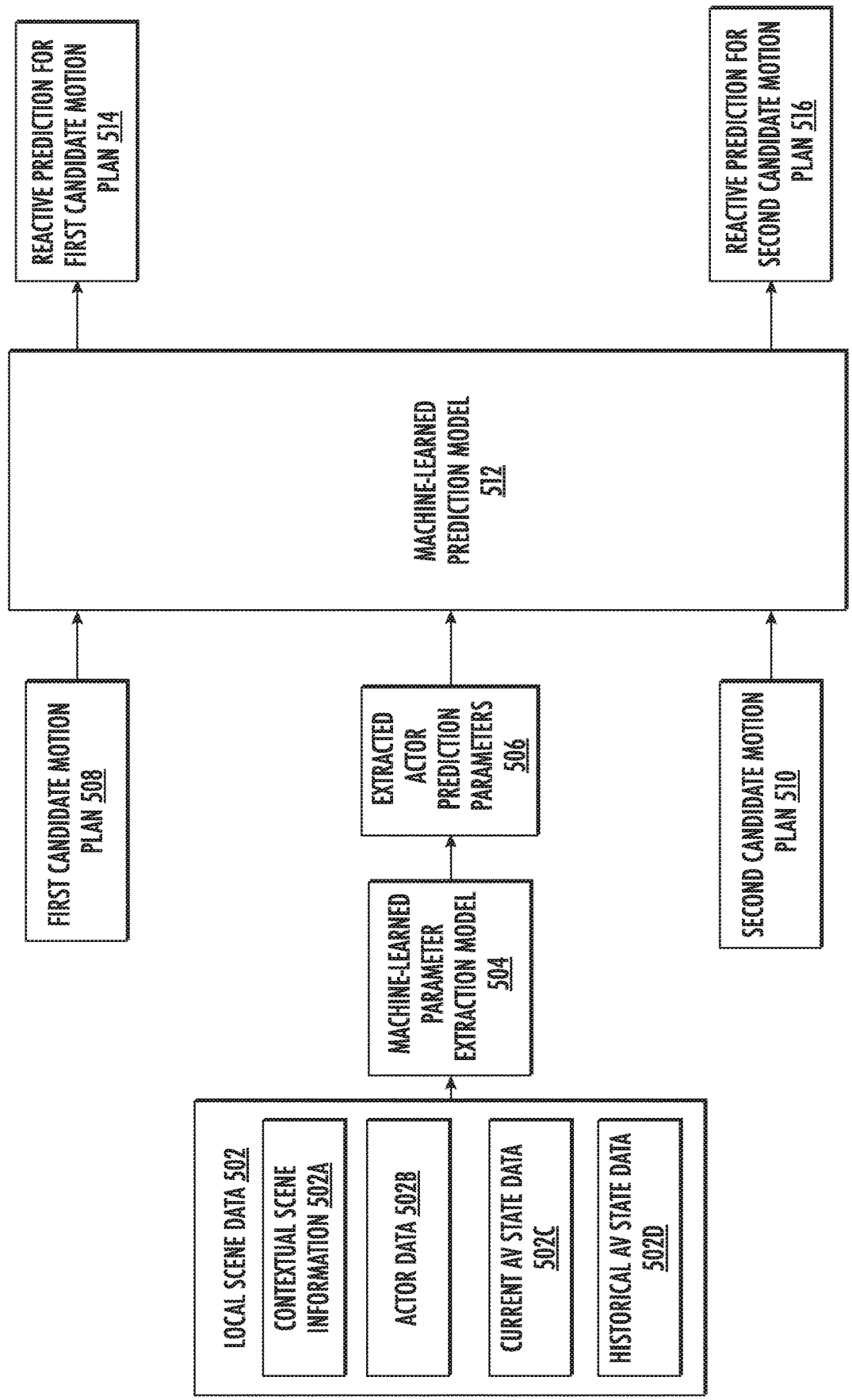
FIG. 5 is a block diagram depicting a process for generating reactive prediction(s) for each candidate motion plan of a plurality of candidate motion plans according to example embodiments of the present disclosure.

FIG. 5 is a block diagram depicting a process for generating reactive prediction(s) for each candidate motion plan of a plurality of candidate motion plans according to example embodiments of the present disclosure. Local scene data 502 can be input into a machine-learned parameter extraction model 504. Local scene data 502 can include contextual scene information 502A, actor data 502B, current autonomous vehicle state data 502C, and historical autonomous vehicle state data 502D, as discussed previously in FIG. 2. The machine-learned parameter extraction model 504 can extract extracted action prediction parameters 506 in the same fashion as discussed previously in FIG. 2.

A machine-learned prediction model 512 can receive the extracted actor prediction parameters 506 and a first candidate motion plan 508 as inputs. Based on the inputs, the machine-learned prediction model 512 can output a reactive prediction for the first candidate motion plan 514. The machine-learned prediction model 512 can receive the extracted actor prediction parameters 506 and a second candidate motion plan 510 as inputs. Based on the inputs, the machine-learned prediction model 512 can output a reactive prediction for the second candidate motion plan 516. Therefore, reactive predictions (e.g., 514 and 516) can be generated for a plurality of candidate motion plans (e.g., 508 and 510) based on one set of extracted actor prediction parameters 506.

Figure 6:
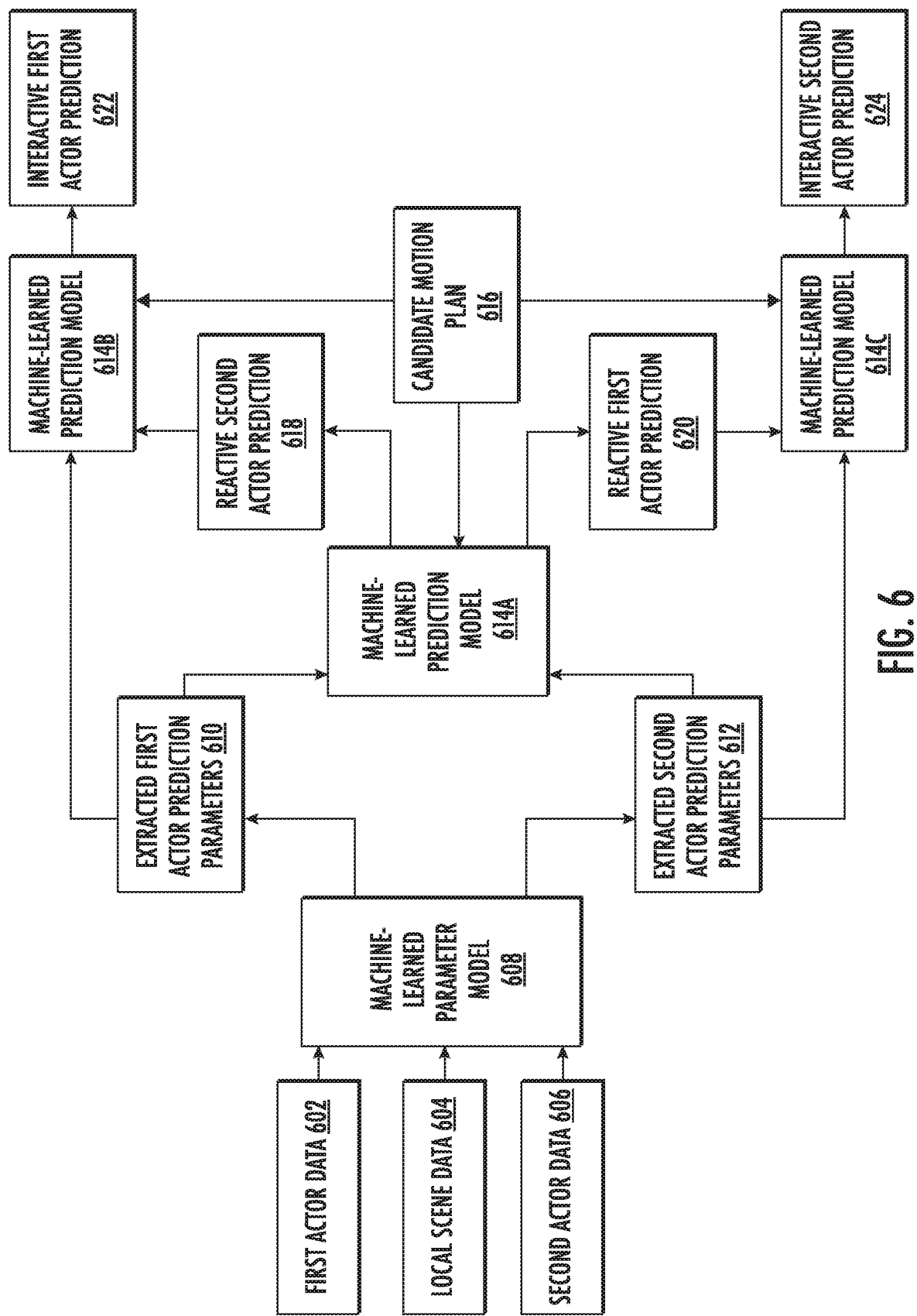
FIG. 6 is a block diagram depicting a process for generating interactive predictions according to example embodiments of the present disclosure.

FIG. 6 is a block diagram depicting a process for generating interactive predictions according to example embodiments of the present disclosure. A machine-learned parameter extraction model 608 can receive first actor data 602, local scene data 604, and second actor data 606. First actor data 602 and second actor data 606 can be actor data respectively describing a first and second actor. The first actor data 602 and second actor data 606 can describe a first and second actor in the same fashion as described in FIG. 2.

The machine-learned parameter extraction model 608 can output extracted first actor prediction parameters 610 based on first actor data 602 and extracted second action prediction parameters based on second actor data 606. The parameters (e.g., 610 and 612) can be extracted in the same fashion as described in FIG. 2. Both the extracted first actor prediction parameters 610 and the extracted second actor prediction parameters 612 can be input into a machine-learned prediction model 614A.

The machine-learned prediction model 614A can receive the extracted first actor prediction parameters 610, the extracted second actor prediction parameters 612, and the candidate motion plan 616 as inputs. It should be noted that the machine-learned prediction model 614A can, in some implementations, be the same machine-learned model as machine-learned prediction model 614B and machine-learned prediction model 614C. In the present depiction, models 614A, 614B, and 614C represent the same model and are divided to simplify the representation of the machine-learned prediction model (e.g., 614A, 614B, 614C). However, in some alternative embodiments, the machine-learned prediction models (e.g., 614A, 614B, 614C) can be discrete copies of the same machine-learned prediction model. In such fashion, the machine-learned models can be discrete entities that are configured to perform the same operations.

The machine-learned prediction model 614A can output a reactive second actor prediction 618 based on the extracted second actor prediction parameters 612 and the candidate motion plan 616. The reactive second actor prediction 618 can include a probability representing a likelihood of the second actor of the second actor data 606 reacting in a particular manner to a movement of the autonomous vehicle based on the candidate motion plan 616. More particularly, this probability can provide a measure of the likely behavior of the second actor in response to a target motion trajectory of the candidate motion plan 616. As an example, the probability can provide a measure of the likelihood that the second actor (e.g., a vehicle, pedestrian, etc.) positioned adjacent to the autonomous vehicle will react in a particular manner (e.g., yield, accelerate, decelerate, etc.) to the autonomous vehicle if the autonomous vehicle follows a suggested trajectory (e.g., performing a lane merging maneuver, etc.).

The machine-learned prediction model 614A can output reactive first actor prediction 620 based on the extracted first actor prediction parameters 610 and the candidate motion plan 616. The reactive first actor prediction 620 can include a probability representing a likelihood of the first actor of the first actor data 602 reacting in a particular manner to a movement of the autonomous vehicle based on the candidate motion plan 616. More particularly, this probability can provide a measure of the likely behavior of the first actor in response to a target motion trajectory of the candidate motion plan 766. As an example, the probability can provide a measure of the likelihood that the first actor (e.g., a vehicle, pedestrian, etc.) positioned adjacent to the autonomous vehicle will react in a particular manner (e.g., yield, accelerate, decelerate, etc.) to the autonomous vehicle if the autonomous vehicle follows a suggested trajectory (e.g., performing a lane merging maneuver, etc.).

The machine-learned prediction model 614B can receive the extracted first actor prediction parameters 610, the reactive second actor prediction 618, and the candidate motion plan 616 and in response, generate an output including an interactive first actor prediction 622. The interactive first actor prediction 622 can include a probability for the first actor in response to the extracted first actor prediction parameters 610, the candidate motion plan 616, and the reactive prediction for the second actor. More particularly, the probability for a first actor (e.g., of first actor data 602) can account for the suggested behavior of the autonomous vehicle and the predicted behavior of a second actor (e.g., reactive second actor prediction 618). By way of example, a reactive second actor prediction 618 can include a prediction that the second actor will decelerate in response to a candidate motion plan 616 from the autonomous vehicle. An interactive first actor prediction 622 for a first actor can include a prediction that the first actor will merge lanes in response to both the candidate motion plan 616 and the deceleration of the first actor.

The machine-learned prediction model 614c can receive the extracted second actor prediction parameters 612, the reactive first actor prediction 620, and the candidate motion plan 616 to output interactive second actor prediction 624. The interactive second actor prediction 624 can include a probability for the second actor in response to the extracted actor prediction parameters 612, the candidate motion plan 616, and the reactive prediction for the first actor. More particularly, the probability for a second actor (e.g., of second actor data) can account for the suggested behavior of the autonomous vehicle and the predicted behavior of a first actor (e.g., reactive first actor prediction 620). By way of example, a reactive first actor prediction 620 can include a prediction that the first actor will decelerate in response to a candidate motion plan 616 from the autonomous vehicle. An interactive second actor prediction 624 for a second actor can include a prediction that the second actor will merge lanes in response to both the candidate motion plan 616 and the deceleration of the second actor.

Thus, the interactive predictions (e.g., 622 and 624) for actors provide causal behavioral predictions for actors in response to both an autonomous vehicle's movement and the predicted behavior of other actors in response to the vehicle's movement. In this fashion, as actors react to both the movement of the autonomous vehicle and the movement of other actors in response to the autonomous vehicle's movement, the autonomous vehicle can more accurately predict the causal effects of a candidate motion plan amongst multiple actors.

Figure 7:
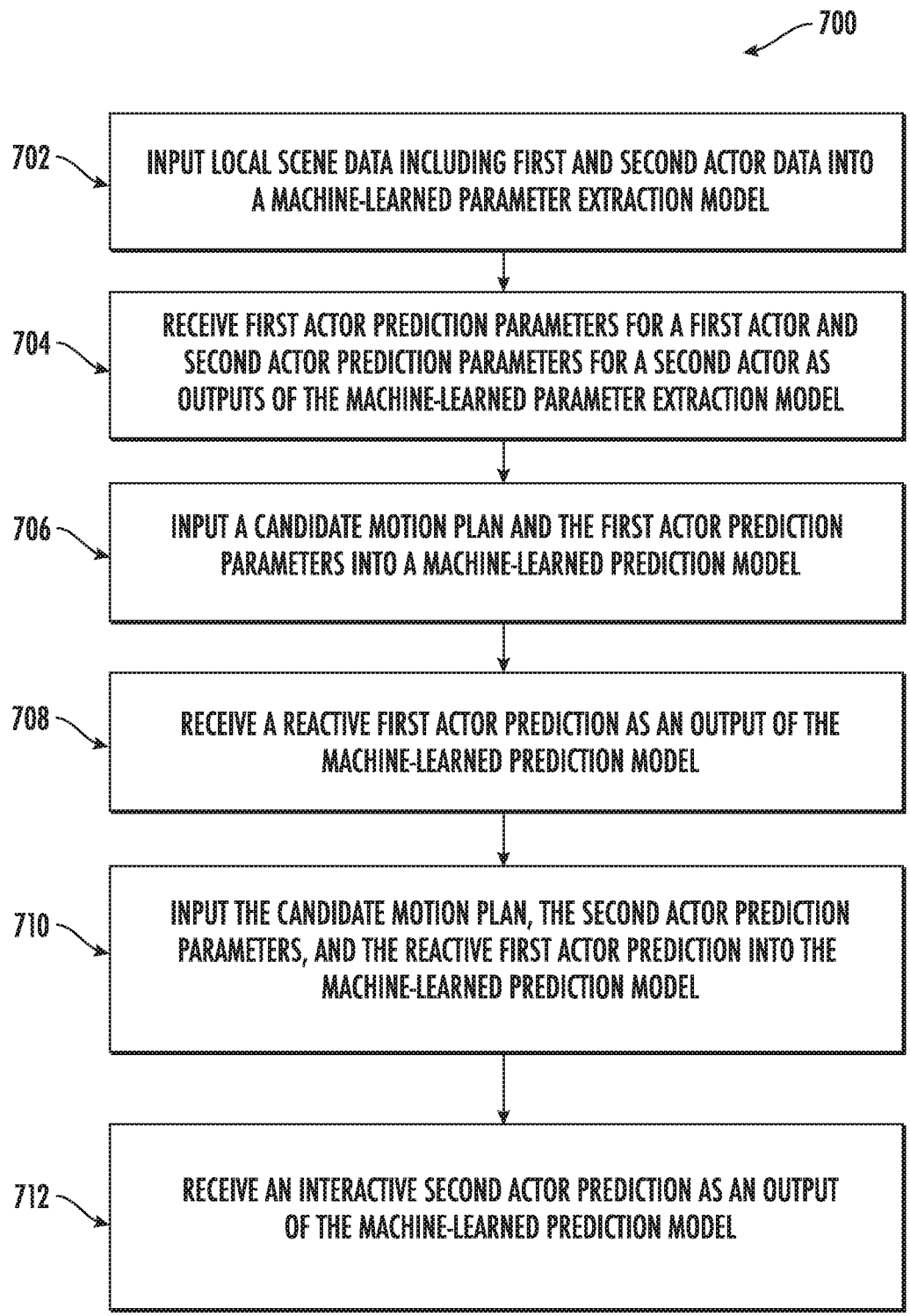
FIG. 7 depicts a flowchart for generating an interactive second actor predictions based at least in part on a first actor reactive prediction according to example embodiments of the present disclosure.

FIG. 7 depicts a flowchart for generating an interactive second actor predictions based at least in part on a first actor reactive prediction according to example embodiments of the present disclosure. One or more portion(s) of the operations of method 700 can be implemented by one or more computing systems that include, for example, a vehicle computing system (e.g., vehicle computing system 112, etc.) Each respective portion of the method 700 can be performed by any (or any combination) of the computing device(s) of the respective computing system. Moreover, one or more portion(s) of the method 700 can be implemented as an algorithm on the hardware components of the device(s) described herein, for example, to generate reactive predictions. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, method 700 can include inputting local scene data including first and second actor data into a machine-learned parameter extraction model. First actor data and second actor data can respectively describe first and second actors (e.g., vehicles, pedestrians, etc.) located in the environment external to the vehicle.

At 704, method 700 can include receiving first actor prediction parameters for the first actor and second actor prediction parameters for the second actor as outputs of the machine-learned parameter extraction model. Actor prediction parameters can be extracted for the first actor in the environment external to the autonomous vehicle. In some implementations, the actor prediction parameters can be a relevant subset of information extracted from the local scene data. As an example, the actor prediction parameters can include weather data and/or a rasterized image map from the local scene data. In some implementations, the actor prediction parameters can be a lower-level representation of at least a portion of the local scene data.

At 706, method 700 can include inputting a candidate motion plan and the first actor prediction parameters into a machine-learned prediction model. The candidate motion plan can include a target motion trajectory for the vehicle and/or certain driving maneuvers (e.g., accelerating, decelerating, merging lanes, etc.). Candidate motion plans can be determined based at least in part on a cost function that evaluates the current locations and/or predicted future locations and/or moving paths of the objects. For example, the cost function can describe a cost (e.g., over time) of adhering to a particular candidate motion plan.

At 708, method 700 can include receiving a reactive first actor prediction as an output of the machine-learned reactor prediction model. The reactive prediction can include a probability representing a likelihood of the first actor reacting in a particular manner to a movement of the autonomous vehicle based on the candidate motion plan. More particularly, this probability can measure the likely behavior of an actor in response to a target motion trajectory of the candidate motion plan. As an example, the probability can measure the likelihood that an actor (e.g., a vehicle, pedestrian, etc.) positioned adjacent to the autonomous vehicle will react in a particular manner (e.g., yield, accelerate, decelerate, etc.) to the autonomous vehicle if the autonomous vehicle follows a suggested trajectory (e.g., performing a lane merging maneuver, etc.).

At 710, method 700 can include inputting the candidate motion plan, the second actor prediction parameters, and the reactive first actor prediction into the machine-learned prediction model.

At 712, method 700 can include receiving an interactive second actor prediction as an output of the machine-learned prediction model. The interactive prediction can be generated based at least in part on the candidate motion plan, the extracted second actor prediction parameters for the second actor, and the reactive prediction for the first actor. More particularly, the machine-learned prediction model can receive the reactive prediction for the first actor as an input to generate the interactive prediction for the second actor.

The interactive second actor prediction can include a probability representing a likelihood of the second actor reacting in a particular manner to movement of the autonomous vehicle based on the candidate motion plan and the reactive prediction for the first actor. More particularly, the probability for the second actor can account for the suggested behavior of the autonomous vehicle and the predicted behavior of the first actor. By way of example, a reactive prediction for the first actor can predict that the first actor will decelerate in response to a candidate motion plan for the autonomous vehicle. An interactive prediction for the second actor can predict that the second actor will merge lanes in response to both the candidate motion plan and the deceleration of the first actor.

Figure 8:
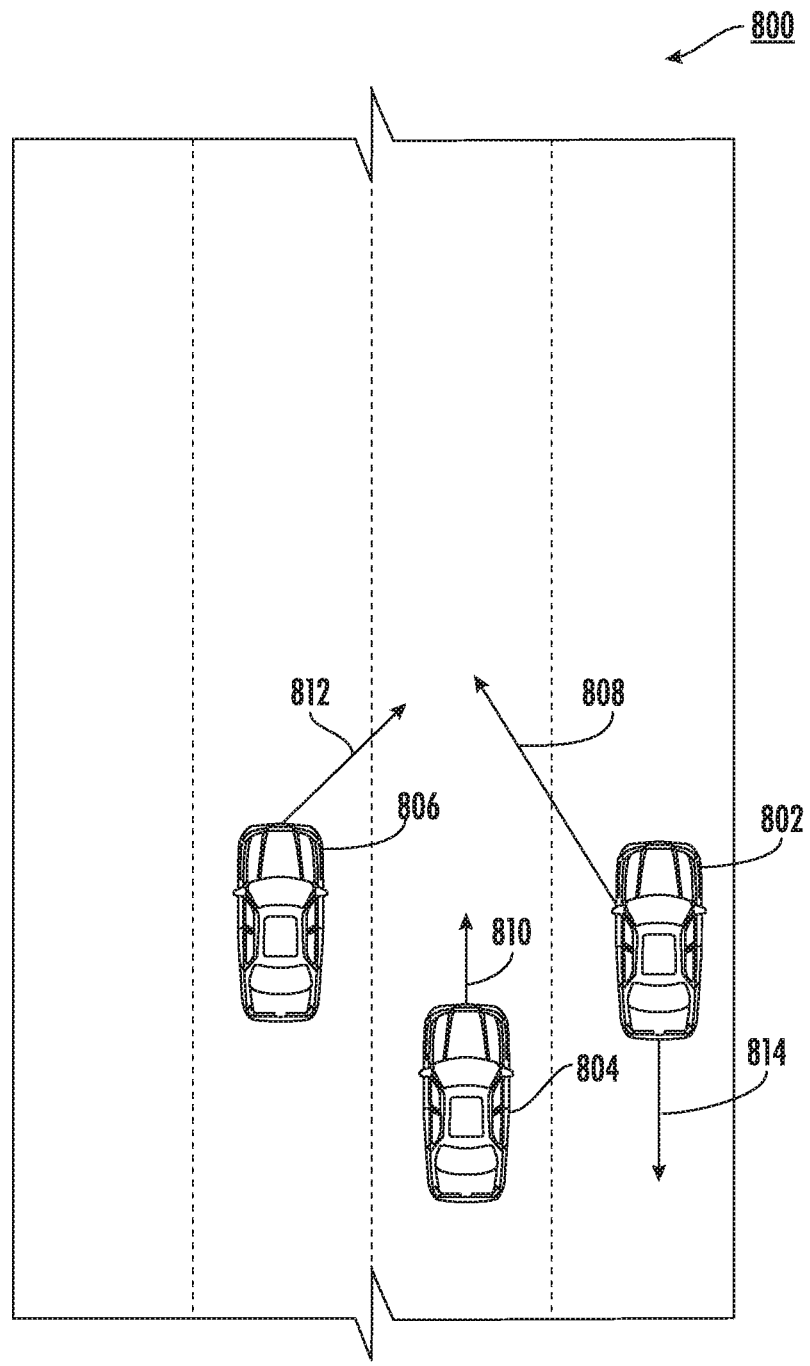
FIG. 8 depicts an example navigation scenario utilizing reactive and/or interactive prediction according to example embodiments of the present disclosure.

FIG. 8 depicts an example navigation scenario utilizing reactive and/or interactive prediction according to example embodiments of the present disclosure. As illustrated, FIG. 8 shows vehicles 802, 804, and 806. Autonomous vehicle 802 can be an autonomous vehicle evaluating a candidate motion plan with a reactive prediction 810 (e.g., including a suggested motion trajectory). Vehicles 804 and 806 can be autonomous or non-autonomous vehicles located in the environment external to the autonomous vehicle 802.

Reactive prediction 810 can represent a predicted behavior of vehicle 804 in response to the suggested motion trajectory 808 of autonomous vehicle 802. More particularly, the reactive prediction 810 can include a probability representing the likelihood that the vehicle 804 will accelerate forward in response to the suggested motion trajectory 808 of autonomous vehicle 802. The reactive prediction 810 can be generated by a machine-learned prediction model of the autonomous vehicle 802.

The interactive prediction 812 can represent a predicted behavior of vehicle 806 in response to the suggested motion trajectory 808 of autonomous vehicle 802 and the reactive prediction 810 for vehicle 804. More particularly, the interactive second actor prediction can include a probability representing a likelihood of the vehicle 806 reacting in a particular manner to movement of the autonomous vehicle 802 based on the suggested motion trajectory 808 and the reactive prediction 810 for vehicle 804. By way of example, the reactive prediction 810 for the vehicle 804 predicts that the vehicle 804 will accelerate in response to suggested motion trajectory 808. Interactive prediction 812 can predict that the vehicle 806 will merge lanes to cut off both vehicles (e.g., 802 and 804) in response to the movement of both vehicles. The interactive prediction 812 can be generated by a machine-learned prediction model of autonomous vehicle 802.

In such fashion, the candidate motion plan including suggested motion trajectory 808 can be quickly and efficiently evaluated by the vehicle computing system of autonomous vehicle 802. As the predicted behavior of other vehicles (e.g., 804 and 806) indicates a relatively high likelihood of collision with the autonomous vehicle, the autonomous vehicle can discard the candidate motion plan including suggested motion trajectory 808 and evaluate an alternative candidate motion plan including suggested motion trajectory 814. The candidate motion plan can be evaluated in the same fashion as described previously by generating reactive and interactive predictions for the actors in the environment external to the vehicle.

Figure 9:
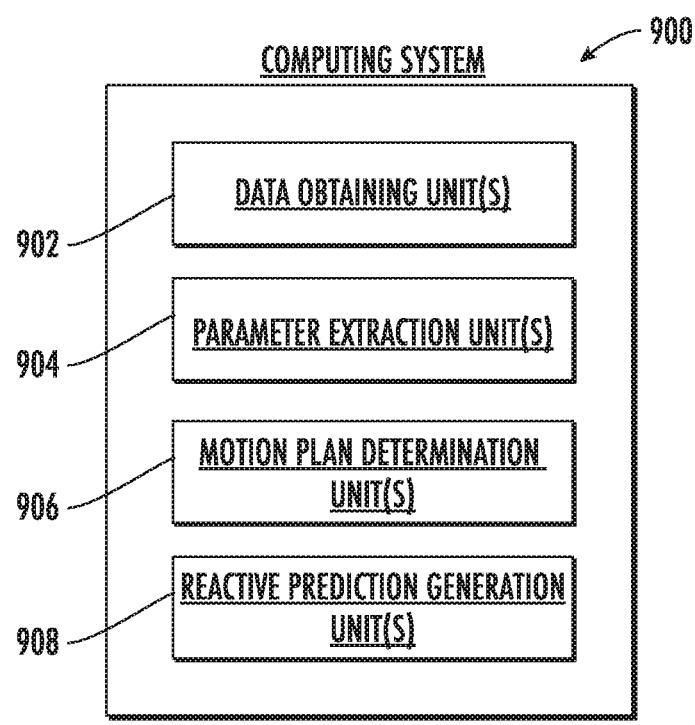
FIG. 9 depicts example system units for performing operations and functions according to example embodiments of the present disclosure.

Various means can be configured to perform the methods and processes described herein. For example, FIG. 9 depicts an example system 900 that includes various means according to example embodiments of the present disclosure. The computing system 900 can be and/or otherwise include, for example, the vehicle computing system. The computing system 900 can include data obtaining unit(s) 902, parameter extraction unit(s) 904, motion plan determination unit(s) 906, reactive prediction generation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s) 902) can be configured to obtain data (e.g., local scene data) from an autonomous vehicle that includes actor data for actor(s) in an environment external to the autonomous vehicle. The data obtaining unit(s) 902 is an example of means for obtaining such data from an autonomous vehicle at a vehicle computing system as described herein.

The means (e.g., the parameter extraction unit(s) 904) can be configured to extract one or more actor prediction parameters from the local scene data for the actor(s) in the environment external to the autonomous vehicle. For example, the means can be configured to use a machine-learned parameter extraction model to extract one or more actor prediction parameters for the actor(s) in the environment external to the autonomous vehicle. The parameter extraction unit(s) 904 is an example of means for extracting actor prediction parameters at a vehicle computing system as described herein.

The means (e.g., motion plan determination unit(s) 906) can be configured to determine candidate motion plans for the autonomous vehicle. For example, the means can be configured to determine a plurality of candidate motion plans that each include a target motion trajectory for the autonomous vehicle. The motion plan determination unit(s) 906 is an example of means for determining candidate motion plan(s) at a vehicle computing system as described herein.

The means (e.g., reactive prediction generation unit(s) 908) can be configured to generate reactive and/or interactive prediction(s) for actor(s) in the environment external to the autonomous vehicle. For example, the means can be configured to generate a reactive prediction for an actor based on extracted actor prediction parameters and a candidate motion plan. The reactive prediction generation unit(s) 908 is an example of means for generating reactive prediction(s) at a vehicle computing system as described herein.

These described functions of the means are provided as examples and are not meant to be limiting. The means can be configured for performing any of the operations and functions described herein.

Figure 10:
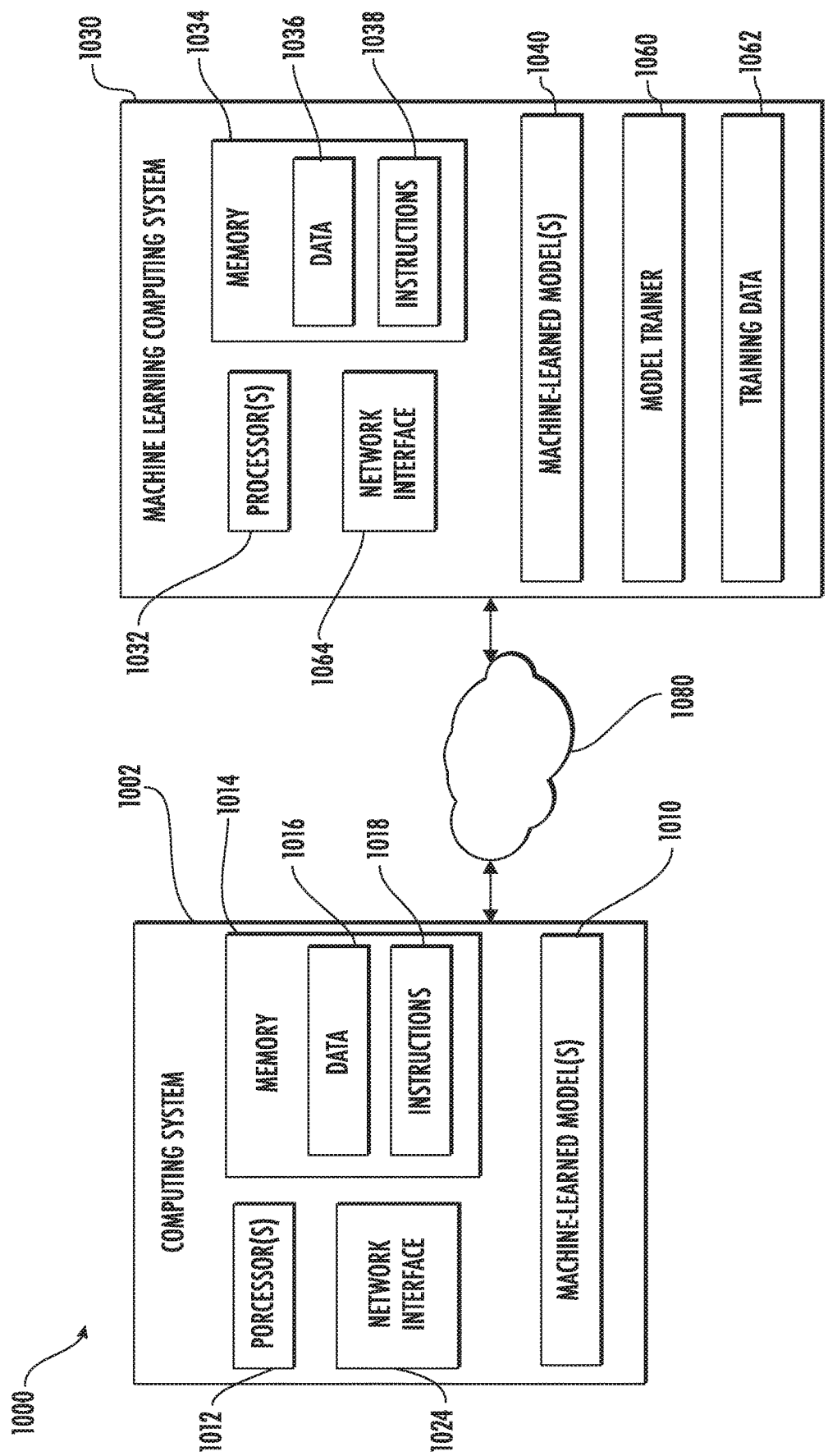
FIG. 10 depicts example system components according to example implementations of the present disclosure.

FIG. 10 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform reactive prediction generation processes and use reactive predictions as part of autonomous vehicle operations. In some implementations, the computing system 1002 can generate reactive predictions using a machine-learned model. In some implementations, the computing system 1002 can be included in an autonomous vehicle. For example, the computing system 1002 can be on-board the autonomous vehicle. In some embodiments, computing system 1002 can be used to implement vehicle computing system 112. In other implementations, the computing system 1002 is not located on-board the autonomous vehicle. For example, the computing system 1002 can operate offline to obtain sensor data and perform reactive prediction generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected.

The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating machine-learned models, extracting actor prediction parameters, generating reactive predictions, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to extract actor prediction parameters, generate reactive predictions, and generate motion plan based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 102.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models and flow graphs as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, extracting actor prediction parameters from local scene data and generating reactive predictions for actors based at least in part on the extracted actor prediction parameters.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate reactive predictions in response to extracted prediction parameters, candidate motion plan(s), and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 160 can train a machine-learned model 1010 and/or 1040 configured to extract actor prediction parameters from local scene data and generate reactive predictions for actor(s). In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for controlling an autonomous vehicle, the method comprising:
   obtaining local scene data associated with an environment external to an autonomous vehicle, the local scene data comprising actor data for an actor in the environment external to the autonomous vehicle;
   extracting, from the local scene data, one or more actor prediction parameters for the actor using a machine-learned parameter extraction model, wherein the actor prediction parameters comprises a latent space representation of at least a portion of the local scene data;
   determining a plurality of candidate target motion trajectories for the autonomous vehicle;
   generating, using a machine-learned prediction model, a plurality of reactive predictions for the actor based at least in part on the one or more actor prediction parameters, wherein the machine-learned prediction model is configured to be less computationally expensive than the machine-learned parameter extraction model, and wherein the plurality of reactive predictions are generated by:
   for each respective candidate target motion trajectory of the plurality of candidate target motion trajectories:
   inputting the latent space representation and the respective candidate target motion trajectory to the machine-learned prediction model;
   generating, using the machine-learned prediction model, a respective reactive prediction for the actor based at least in part on the one or more actor prediction parameters and the respective candidate target motion trajectory, the respective reactive prediction comprising a probability representing a likelihood of the actor reacting in a particular manner to a movement of the autonomous vehicle based on the respective candidate target motion trajectory; and operating the autonomous vehicle according to the respective candidate target motion trajectory.

2. The computer-implemented method of claim 1, wherein the machine-learned prediction model executes a plurality of times for each execution of the machine-learned parameter extraction model.

3. The computer-implemented method of claim 2, wherein operating the autonomous vehicle according to the respective candidate target motion trajectory comprises:
for the respective candidate target motion trajectory, assigning a candidate rating to the respective candidate target motion trajectory based at least in part on the respective reactive prediction for the actor;
selecting, based at least in part on the candidate rating for the respective candidate target motion trajectory, an optimal candidate target motion trajectory from the plurality of candidate target motion trajectories; and
operating the autonomous vehicle based on the optimal candidate target motion trajectory.

4. The computer-implemented method of claim 2, further comprising:
generating, using the machine-learned prediction model, an interactive prediction for a first actor based at least in part on the one or more actor prediction parameters for the first actor, the respective candidate target motion trajectory, and a reactive prediction for a second actor, the interactive prediction comprising a probability representing a likelihood of the first actor reacting in a particular manner to movement of the autonomous vehicle based on the respective candidate target motion trajectory and behavior of the second actor based on the reactive prediction for the second actor.

5. The computer-implemented method of claim 1, wherein, within a prescribed period of time, the machine-learned parameter extraction model executes once and the machine-learned prediction model executes a plurality of times.

6. The computer-implemented method of claim 1, wherein the machine-learned prediction model predicts actor behavior in response to multiple candidate motions plans using feature data that is extracted once per evaluation cycle.

7. The computer-implemented method of claim 1, wherein the machine-learned prediction model executes more quickly than the machine-learned parameter extraction model.

8. An autonomous vehicle control system for controlling an autonomous vehicle, the autonomous vehicle control system comprising:
one or more processors; and
one or more non-transitory computer-readable media storing instructions that are executable by the one or more processors to cause the autonomous vehicle control system to perform operations, the operations comprising:
obtaining local scene data associated with an environment external to an autonomous vehicle, the local scene data comprising actor data for an actor in the environment external to the autonomous vehicle;
extracting, from the local scene data, one or more actor prediction parameters for the actor using a machine-learned parameter extraction model, wherein the actor prediction parameters comprise a latent space representation of at least a portion of the local scene data;
determining a plurality of candidate target motion trajectories for the autonomous vehicle;
generating, using a machine-learned prediction model, a plurality of reactive predictions for the actor based at least in part on the one or more actor prediction parameters, wherein the machine-learned prediction model is configured to be less computationally expensive than the machine-learned parameter extraction model, and wherein the plurality of reactive predictions are generated by:
for each respective candidate target motion trajectory of the plurality of candidate target motion trajectories:
inputting the latent space representation and the respective candidate target motion trajectory to the machine-learned prediction model;
generating, using the machine-learned prediction model, a respective reactive prediction for the actor based at least in part on the one or more actor prediction parameters and the respective candidate target motion trajectory, the respective reactive prediction comprising a probability representing a likelihood of the actor reacting in a particular manner to a movement of the autonomous vehicle based on the respective candidate target motion trajectory; and
operating the autonomous vehicle according to the respective candidate target motion trajectory.

9. The autonomous vehicle control system of claim 8, wherein the machine-learned prediction model executes a plurality of times for each execution of the machine-learned parameter extraction model.

10. The autonomous vehicle control system of claim 8, wherein, within a prescribed period of time, the machine-learned parameter extraction model executes once and the machine-learned prediction model executes a plurality of times.

11. The autonomous vehicle control system of claim 8, wherein the machine-learned prediction model predicts actor behavior in response to multiple candidate motions plans using feature data that is extracted once per evaluation cycle.

12. The autonomous vehicle control system of claim 8, wherein the machine-learned prediction model executes more quickly than the machine-learned parameter extraction model.

13. The autonomous vehicle control system of claim 9, wherein operating the autonomous vehicle according to the respective candidate target motion trajectory comprises:
for the respective candidate target motion trajectory, assigning a candidate rating to the respective candidate target motion trajectory based at least in part on the respective reactive prediction for the actor;
selecting, based at least in part on the candidate rating for the respective candidate target motion trajectory, an optimal candidate target motion trajectory from the plurality of candidate target motion trajectories; and
operating the autonomous vehicle based on the optimal candidate target motion trajectory.

14. The autonomous vehicle control system of claim 9, wherein the operations comprise:
generating, using the machine-learned prediction model, an interactive prediction for a first actor based at least in part on the one or more actor prediction parameters for the first actor, the respective candidate target motion trajectory, and a reactive prediction for a second actor, the interactive prediction comprising a probability representing a likelihood of the first actor reacting in a particular manner to movement of the autonomous vehicle based on the respective candidate target motion trajectory and behavior of the second actor based on the reactive prediction for the second actor.

15. One or more non-transitory computer-readable media storing instructions that are executable by one or more processors to cause an autonomous vehicle control system to perform operations, the operations comprising:
- obtaining local scene data associated with an environment external to an autonomous vehicle, the local scene data comprising actor data for an actor in the environment external to the autonomous vehicle;
- extracting, from the local scene data, one or more actor prediction parameters for the actor using a machine-learned parameter extraction model, wherein the actor prediction parameters comprise a latent space representation of at least a portion of the local scene data;
- determining a plurality of candidate target motion trajectories for the autonomous vehicle;
- generating, using a machine-learned prediction model, a plurality of reactive predictions for the actor based at least in part on the one or more actor prediction parameters, wherein the machine-learned prediction model is configured to be less computationally expensive than the machine-learned parameter extraction model, and wherein the plurality of reactive predictions are generated by:
    - for each respective candidate target motion trajectory of the plurality of candidate target motion trajectories:
        - inputting the latent space representation and the respective candidate target motion trajectory to the machine-learned prediction model;
        - generating, using the machine-learned prediction model, a respective reactive prediction for the actor based at least in part on the one or more actor prediction parameters and the respective candidate target motion trajectory, the respective reactive prediction comprising a probability representing a likelihood of the actor reacting in a particular manner to a movement of the autonomous vehicle based on the respective candidate target motion trajectory; and
- operating the autonomous vehicle according to the respective candidate target motion trajectory.

16. The one or more non-transitory computer-readable media of claim 15, wherein the machine-learned prediction model executes a plurality of times for each execution of the machine-learned parameter extraction model.

17. The one or more non-transitory computer-readable media of claim 15, wherein, within a prescribed period of time, the machine-learned parameter extraction model executes once and the machine-learned prediction model executes a plurality of times.

18. The one or more non-transitory computer-readable media of claim 15, wherein the machine-learned prediction model predicts actor behavior in response to multiple candidate motions plans using feature data that is extracted once per evaluation cycle.

19. The one or more non-transitory computer-readable media of claim 15, wherein the machine-learned prediction model executes more quickly than the machine-learned parameter extraction model.

20. The one or more non-transitory computer-readable media of claim 16, wherein the operations comprise:
- generating, using the machine-learned prediction model, an interactive prediction for a first actor based at least in part on the one or more actor prediction parameters for the first actor, the respective candidate target motion trajectory, and a reactive prediction for a second actor, the interactive prediction comprising a probability representing a likelihood of the first actor reacting in a particular manner to movement of the autonomous vehicle based on the respective candidate target motion trajectory and behavior of the second actor based on the reactive prediction for the second actor.

* * * * *

UNITED STATES PATENT AND TRADEMARK OFFICE
CERTIFICATE OF CORRECTION

| | | |
|---|---|---|
| PATENT NO. | : 11,891,087 B2 | Page 1 of 1 |
| APPLICATION NO. | : 16/817068 | |
| DATED | : February 6, 2024 | |
| INVENTOR(S) | : Marchetti-Bowick et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this
First Day of July, 2025

Coke Morgan Stewart
*Acting Director of the United States Patent and Trademark Office*